United States Patent
Lee et al.

(10) Patent No.: US 12,210,739 B2
(45) Date of Patent: Jan. 28, 2025

(54) DEVICE AND METHOD FOR RECOMMENDING CUSTOMIZED FUNCTION IN ELECTRONIC DEVICE

(71) Applicant: SAMSUNG ELECTRONICS CO., LTD., Suwon-si (KR)

(72) Inventors: Miyoung Lee, Suwon-si (KR); Youngchan Woo, Suwon-si (KR); Seungjoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/227,404

(22) Filed: Jul. 28, 2023

(65) Prior Publication Data

US 2024/0126426 A1 Apr. 18, 2024

Related U.S. Application Data

(63) Continuation of application No. PCT/KR2023/009930, filed on Jul. 12, 2023.

(30) Foreign Application Priority Data

Oct. 17, 2022 (KR) .......................... 10-2022-0133374

(51) Int. Cl.
*G06F 3/0488* (2022.01)
*G06F 3/01* (2006.01)
(Continued)

(52) U.S. Cl.
CPC ............ *G06F 3/0488* (2013.01); *G06F 3/012* (2013.01); *G06F 3/0481* (2013.01); *G06F 3/0484* (2013.01)

(58) Field of Classification Search
CPC ...... G06F 3/0488; G06F 3/012; G06F 3/0481; G06F 3/0484
See application file for complete search history.

(56) References Cited

U.S. PATENT DOCUMENTS 9,785,228 B2 10/2017 Schwesinger et al.
9,847,013 B2 12/2017 Song et al.
(Continued)

FOREIGN PATENT DOCUMENTS

JP 3027521 4/2000
JP 2008-90454 4/2008
(Continued)

OTHER PUBLICATIONS

International Search Report dated Oct. 5, 2023 in International Patent Application No. PCT/KR2023/009930.
(Continued)

*Primary Examiner* — Robert J Michaud
(74) *Attorney, Agent, or Firm* — STAAS & HALSEY LLP

(57) ABSTRACT

A device and method for recommending a custom function to the user in an electronic device. The electronic device may obtain information of a user gesture that repeatedly occurs based on interaction of the user detected by at least one sensor and determine one or more customized functions to be suggested to the user, among functions of the electronic device including a plurality of accessibility functions, in consideration of the information of the user gesture. The electronic device may execute a target customized function selected by the user from among the one or more customized functions.

20 Claims, 21 Drawing Sheets

(51) Int. Cl.
*G06F 3/0481* (2022.01)
*G06F 3/0484* (2022.01)

(56) References Cited

U.S. PATENT DOCUMENTS

| | | | |
|---|---|---|---|
| 10,073,519 | B2 | 9/2018 | Mun et al. |
| 10,150,410 | B2 | 12/2018 | Medenica et al. |
| 2014/0201122 | A1* | 7/2014 | Park .................. H04N 21/4667 706/46 |
| 2015/0207920 | A1 | 7/2015 | Choi et al. |
| 2016/0284200 | A1* | 9/2016 | Song .................. G08B 21/182 |
| 2020/0344195 | A1 | 10/2020 | Jang |
| 2022/0263783 | A1 | 8/2022 | Jang |

FOREIGN PATENT DOCUMENTS

| | | |
|---|---|---|
| JP | 2012-181670 | 9/2012 |
| JP | 5332908 | 11/2013 |
| JP | 6007758 | 10/2016 |
| JP | 2018-140766 | 9/2018 |
| JP | 6865052 | 4/2021 |
| KR | 10-1291383 | 7/2013 |
| KR | 10-2014-0092634 | 7/2014 |
| KR | 10-2015-0087680 | 7/2015 |
| KR | 10-2017-0021157 | 2/2017 |
| KR | 10-2065415 | 1/2020 |
| KR | 10-2160650 | 9/2020 |
| KR | 10-2223693 | 3/2021 |
| KR | 10-2363974 | 2/2022 |
| WO | WO 2014/124065 A1 | 8/2014 |

OTHER PUBLICATIONS

PCT/ISA/237 dated Oct. 5, 2023 in International Patent Application No. PCT/KR2023/009930.

* cited by examiner

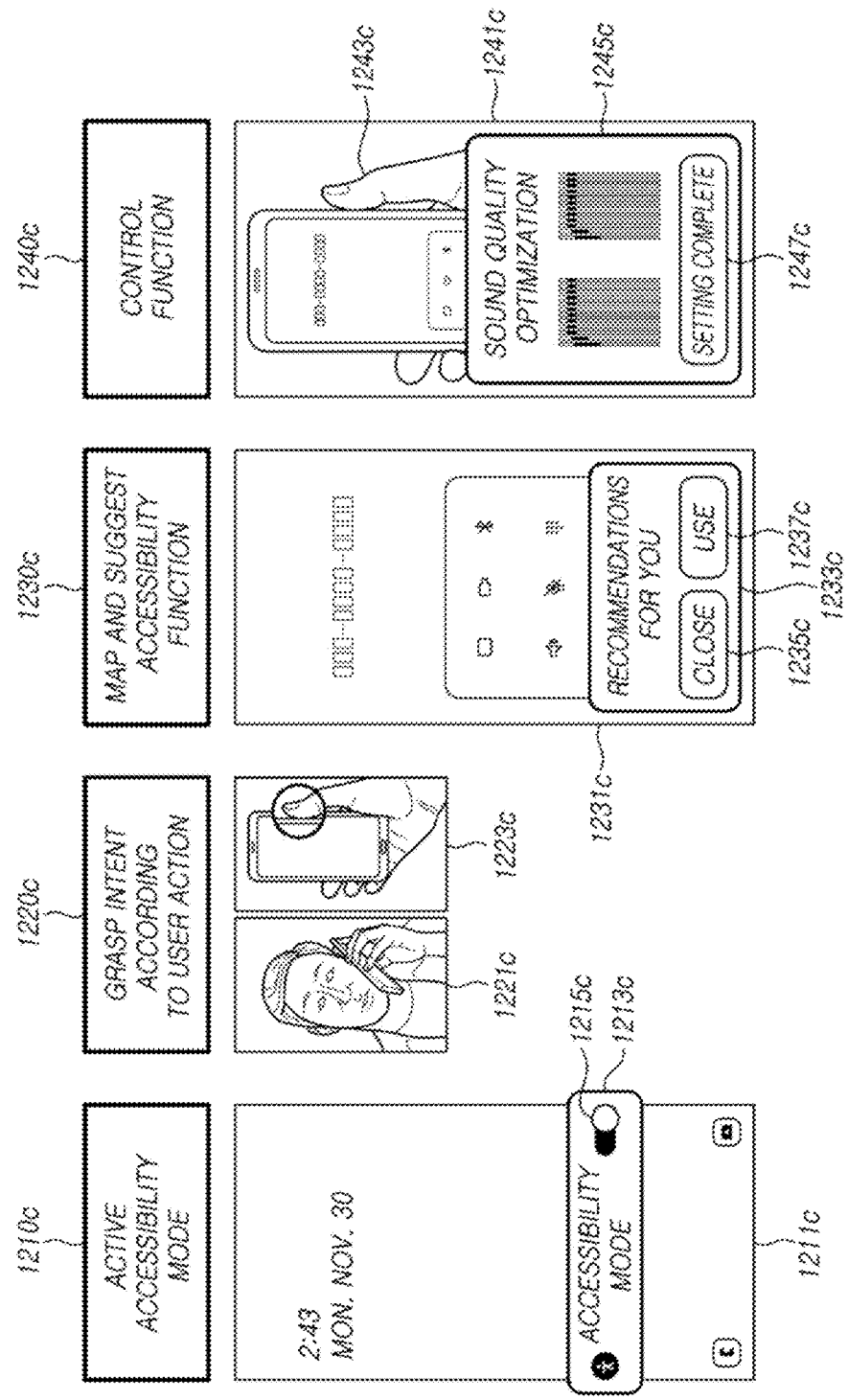

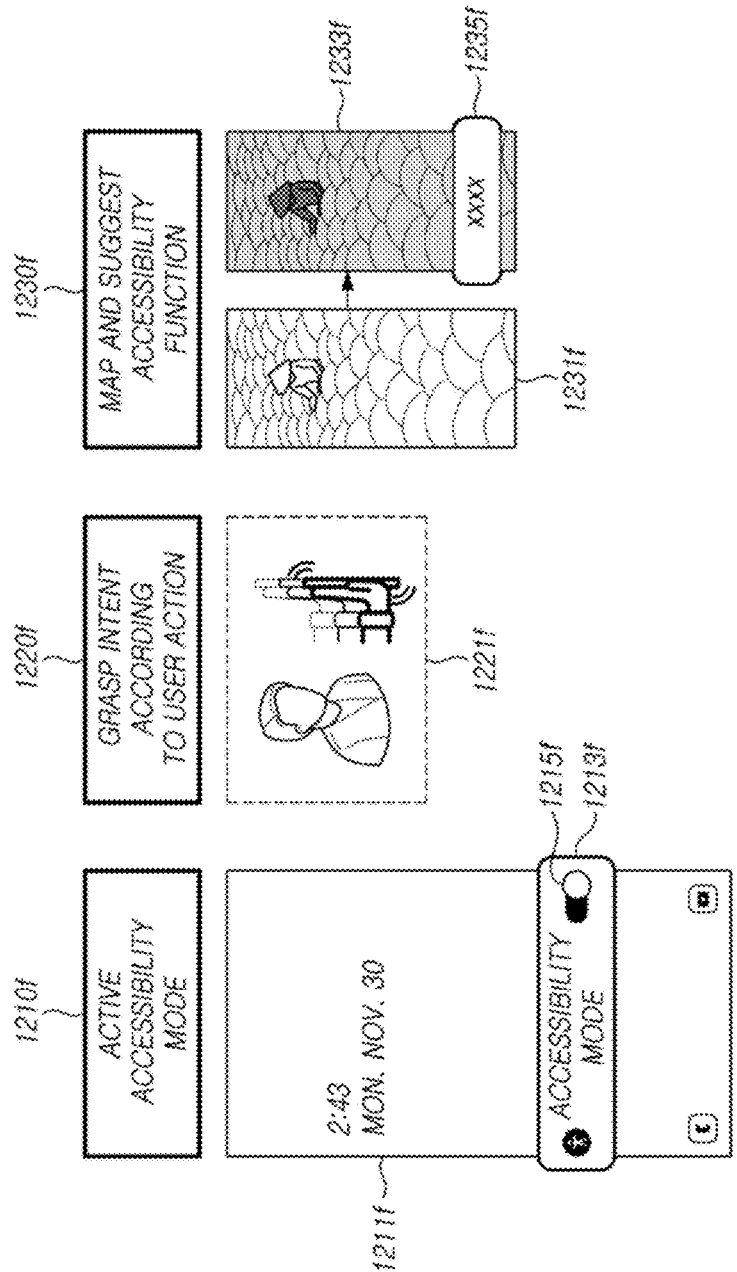

DEVICE AND METHOD FOR RECOMMENDING CUSTOMIZED FUNCTION IN ELECTRONIC DEVICE

CROSS-REFERENCE TO RELATED APPLICATIONS

This application is a continuation application of International Application No. PCT/KR2023/009930 designating the United States, filed on Jul. 12, 2023, in the Korean Intellectual Property Receiving Office, which claims priority from Korean Patent Application No. 10-2022-0133374, filed on Oct. 17, 2022, in the Korean Intellectual Property Office, the disclosures of which are hereby incorporated by reference herein in their entireties.

BACKGROUND

Field

The disclosure relates to a device and method for recommending a custom function to the user in an electronic device.

Description of Related Art

An electronic device may install various applications (hereinafter referred to as 'app(s)') providing specific functions or services. The electronic device may install or execute an app in response to the user's request. The electronic device may output information according to the execution of the app through an audio output means, such as a display or a speaker. The electronic device may include a smartphone, a mobile phone, or a tablet device that is easy to carry by the user.

Due to the widespread popularity of these electronic devices, many apps may be installed by users to meet their personal or business needs. However, only a few of the apps installed on an electronic device are used by the user, and most of them may have very little chance of being used. For this reason, users may not be familiar with the exact apps installed on their electronic devices, making it difficult for them to access the apps they want when needed. Accordingly, users may wish to be able to easily and quickly use an app providing desired functions on an electronic device.

SUMMARY

According to an embodiment, an electronic device may comprise a display module including a touch panel and a display, at least one sensor, to detect an interaction of a user with the electronic device, the at least one sensor being configured to generate a detection signal according to the interaction of the user that is detected by the at least one sensor, and a least one processor electrically to the display module or the at least one sensor module, the at least one processor being configured to suggest one or more customized functions for the user based on information collected in association with the interaction of the user.

In an embodiment, the at least one processor may be configured to obtain information of a user gesture that repeatedly occurs based on the interaction of the user detected by the at least one sensor, determine the one or more customized functions to be suggested to the user, among functions of the electronic device including a plurality of accessibility functions, in consideration of the information of the user gesture, and control the display module to display information of one or more customized functions on the display.

According to an embodiment, a method of recommending a function to a user by an electronic device may comprise obtaining information of a user gesture that repeatedly occurs based on interaction of a user with the electronic device, determining one or more customized functions to suggest to the user, among functions of the electronic device including a plurality of accessibility functions, based on collection of user gestures, and displaying information of one or more customized functions on a display.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A, 12B, 12C, 12D, 12E and 12F are views illustrating a scenario for recommending and executing a customized function for a vision aid function or a hearing aid function which is an accessibility function in an electronic device according to an embodiment.

DETAILED DESCRIPTION

Figure 1:
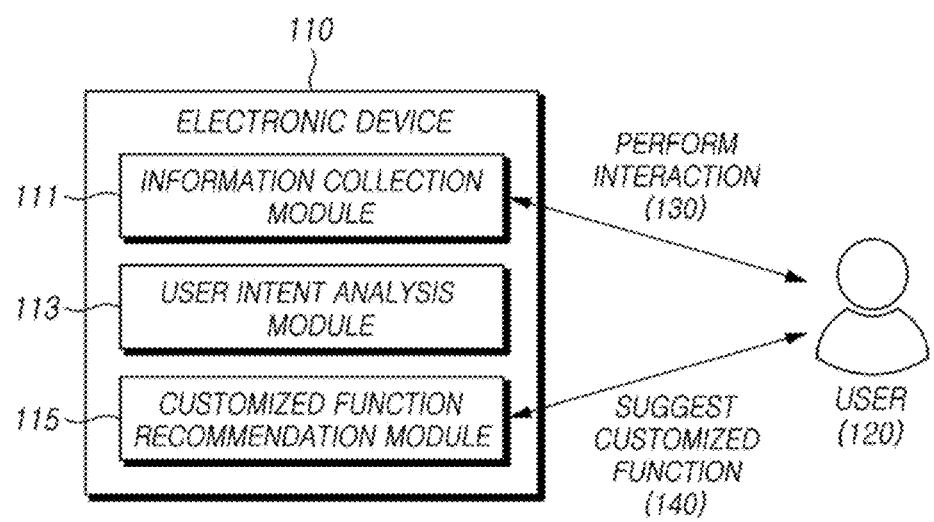
FIG. 1 is a conceptual diagram for suggesting a customized function to a user in an electronic device according to an embodiment.

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

An embodiment of the disclosure may provide a device and method for recommending a customized function to the user based on the user's behavior obtained through interaction with the user in an electronic device.

According to an embodiment of the disclosure, as the electronic device predicts the user's intent and guides the user to a required accessibility function, it is possible to allow the user to use a desired accessibility function in an intuitive, easy, and convenient manner.

The technical objects of the disclosure are not limited to the foregoing, and other technical objects may be derived by one of ordinary skill in the art from example embodiments of the disclosure.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

FIG. 1 is a conceptual diagram for suggesting a customized function to the user in an electronic device according to an embodiment; Referring to FIG. 1, the electronic device 110 may select a customized function reflecting the intent (or needs) of the user 120 and provide the selected customized function to the user 120. For example, the electronic device 110 may select a customized function considering functions of the installed apps. The electronic device 110 may include a pre-installed or factory-installed apps (also referred to as "basic apps"). The electronic device 110 may include additional apps installed by the user 120. The basic apps may include an accessibility app that provides an accessibility function. The accessibility function may be a function to assist the user 120 who has difficulties and challenges in using the electronic device 110. The accessibility function may be provided by the basic app. The accessibility functions may include a hearing aid function, a vision aid function or an action aid function.

The electronic device 110 may perform a plurality of operations, in a step-by-step manner, to recommend a customized function to the user 120. For example, the electronic device 110 may perform the first operation through interaction with the user 120. The first operation may be an operation to collect data, e.g., context information, movement information, or vision recognition information, of the user 120 in order to determine the user's intent. For example, the electronic device 110 may perform a second operation to determine the intent of the user 120 by taking into consideration the collected data. For example, the electronic device 110 may perform a third operation of selecting a customized function to recommend after taking into consideration the determined intent of the user 120. For example, the electronic device 110 may perform a fourth operation of transmitting the selected customized function to the user 120. For example, the electronic device 110 may perform a fifth operation of allowing the user 120 to control the customized function, executed at the request of the user 120, among the recommended customized functions.

The electronic device 110 may include an information collection module 111 for processing the first operation, a user intent analysis module 113 for processing the second operation, and a customized function recommendation module 115 for processing the third operation or the fourth operation. The electronic device 110 may include a plurality of modules instead of the customized function recommendation module 115. The plurality of modules may include a customized function selection module (not shown) for processing the third operation or a customized function transfer module (not shown) for processing the fourth operation. The electronic device 110 may include a user command processing module (not shown) for processing the fifth operation.

According to an embodiment, the information collection module 111 may detect context information for classifying the category of the app being used by the user. The context information may include a text content page activation state in which a screen, not zoomed-in, is being outputted, a state in which a call is being made, a state in which a video is being viewed, or a state in which a specific accessibility function is being executed.

The information collection module 111 may interact with the user 120 (130). The information collection module 111 may detect an action (gesture or movement) or a change in facial expression of the user 120 through interaction with the user 120. For example, the action of the user 120 may be repeatedly performed by a predetermined number of times (two or more times) at a predetermined period (N seconds). The action of the user 120 may include an action that the user 120 moves the screen of the electronic device 110 towards or away from the user's face, e.g., an action taken because the image displayed on the screen is not visible. The action of the user 120 may include an action of the user 120 lifting up or adjusting the glasses, e.g., an action taken because the image displayed on the screen is not visible. The action of the user 120 may include an action in which the user 120 continuously manipulates a volume key provided in the electronic device 110, e.g., an action taken because the user wants to hear the sound clearly. The action of the user 120 may include an action in which the user 120 zooms in and/or out the screen of the electronic device 110, e.g., an action taken because the user wants to resize and see the screen. The action of the user 120 may include an action, e.g., an action taken due to a situation where the sound cannot be heard, in which the user 120 moves the electronic device 110 closer to the ear while video content is being played. The action of the user 120 may include an action of showing the screen of the electronic device 110 to another person. e.g., an action requiring temporary release of the accessibility function. The action of the user 120 may include an action of shaking the electronic device 110 by the user 120, e.g., an action taken to request deactivation of the accessibility function. The facial expression change may include a facial expression of the user 120 frowning or squinting, e.g., a facial expression taken because the image displayed on the screen is not visible.

As an example, the information collection module 111 may obtain information about the action of the user 120 using the collected data. The collected data may include an image of the user captured by the camera module, e.g., the camera module 920 of FIG. 9. The collected data may include a detection signal transmitted by a sensor module, e.g., the sensor module 930 of FIG. 9. The collected data may include a touch sensing signal transmitted from a touch panel included in a display module, e.g., the display module 950 of FIG. 9. The collected data may include an input signal transmitted from an input module, e.g., the input module 960 of FIG. 9, such as a keypad. The information collection module 111 may obtain data about the action of the user 120 considering at least one of each of the previously collected data or a combination of collected data.

The information collection module 111 may obtain data about the action or gesture of the user 120, e.g., the action of moving the screen towards or away from or a movement of lifting/adjusting the glasses, from the user's image captured by the camera module.

The information collection module 111 may collect data about the action (gesture), e.g., the action of moving the screen towards or away from, of the user 120 or a movement, e.g., a movement of turning or shaking the screen of the electronic device 110 by the user 120 from a detection signal transmitted from the sensor module.

The information collection module 111 may collect data about the request of the user 120, e.g., pinch zoom-in/out action or reduce or increase volume on the screen via touch, from the touch signal transmitted from the touch panel.

The information collection module 111 may collect data about the action of the user 120, e.g., an action of continuously pressing a physical button for volume adjustment, from an input signal transmitted from the input module.

According to an embodiment, the user intent analysis module 113 may analyze the intent of the user 120 considering the context information collected by the information collection module 111, the action (gesture) of the user 120, or the change in the facial expression of the user 120.

The user intent analysis module 113 may analyze that the intent of the user 120 is 'to see the text clearly' when data about the action of the user 120 moves the screen of the electronic device 110 towards and then away from the user is collected while the text content is displayed (determined as context information).

The user intent analysis module 113 may analyze that the intent of the user 120 is 'to see the text clearly' when data about the action of the user 120 lifting/adjusting glasses is collected while the text content is displayed (determined as context information).

The user intent analysis module 113 may analyze that the intent of the user 120 is 'to hear the sound clearly' when the data about the action of the user 120, continuously manipulating the volume key provided in the electronic device 110, is collected while the user 120 is on the phone (determined as context information).

The user intent analysis module 113 may analyze that the intent of the user 120 is 'to adjust the size of the screen,' by taking into account the collected data on zooming in/out actions taken by the user 120 while the status on the screen of the electronic device 110 displays that the screen is not zoomed-in (determined as context information).

The user intent analysis module 113 may analyze that the intent of the user 120 is 'to see the subtitle' when the data about the action (less than or equal to a specific decibel) of the user 120 moving the electronic device 110 close to the ear while video content is being played (determined as context information).

The user intent analysis module 113 may analyze that the intent of the user 120 is 'to temporarily release the accessibility function' when the data about showing the screen of the electronic device 110 to another person is collected while the accessibility function is being executed (determined as context information).

The user intent analysis module 113 may analyze that the intent of the user 120 is to 'request deactivation of the accessibility function' when the data about the user 120 shaking the electronic device 110 is collected while the accessibility function is being executed (determined as context information).

The user intent analysis module 113 may analyze that the intent of the user 120 is 'to see the text clearly' when data about the facial expression of the user 120 frowning or squinting is collected while text content is displayed (determined as context information).

According to an embodiment, the customized function recommendation module 115 may obtain one or more customized functions to be recommended for the intent of the user 120 analyzed from the user action intent list, e.g., refer to Table 2 below. For example, an initial version of the user action intent list may be preset (or preconfigured). For example, the customized function recommendation module 115 may update the user action intent list based on information about the user's action type, facial expression type, or user's intent through learning. The customized function recommendation module 115 may provide the obtained information about one or more customized functions to the user 120 (customized function suggestion 140). The obtained information about one or more customized functions may be displayed, for example, as a pop-up message on the screen.

For example, when analyzing that the intent of the user 120 is to see the text clearly, the customized function recommendation module 115 may recommend the font size/thickness adjustment function. The customized function recommendation module 115 may recommend a 'font size/thickness adjustment function' while outputting a guide message, 'adjust the font size and style if you can't see the text clearly,' through the display. The customized function recommendation module 115 may display a 'use' function button to activate the 'font size/thickness adjustment function' and a 'close' function button to avoid activating the 'font size/thickness adjustment function.'

For example, the customized function recommendation module 115 may recommend a 'sound quality optimization function' when analyzing that the intent of the user 120 is to 'listen to the sound clearly.' The customized function recommendation module 115 may recommend the 'sound quality optimization function' and output a guide message, 'If you want to hear sound better, try to optimize sound quality,' through the display. The customized function recommendation module 115 may display a 'use' function button to activate the 'sound quality optimization function' and a 'close' function button to avoid activating the 'sound quality optimization function.'

For example, when analyzing that the intent of the user 120 is to 'adjust the size of the screen,' the customized function recommendation module 115 may recommend a zoom-in (magnifying glass) function. The customized function recommendation module 115 may recommend a zoom-in (magnifying glass) function while outputting a guide message, 'If you want to zoom in the screen, use the zoom-in function like a magnifying glass,' through the display. The customized function recommendation module 115 may display a 'use' function button to activate the 'zoom-in (magnifying glass) function' and a 'close' function button to avoid activating the 'zoom-in (magnifying glass) function.'

For example, when analyzing that the intent of the user 120 is 'to see the subtitle,' the customized function recommendation module 115 may recommend a subtitle function. The customized function recommendation module 115 may recommend the subtitle function while outputting a guide message, 'If you can't hear the sound, turn on the subtitle function,' through the display. The customized function recommendation module 115 may display a 'use' function button to activate the 'subtitle function' and a 'close' function button to avoid activating the 'subtitle function.'

For example, when analyzing that the intent of the user 120 is 'to temporarily release the accessibility function,' the customized function recommendation module 115 may recommend to 'temporarily terminate the accessibility function.' The customized function recommendation module 115 may output a guide message, 'Accessibility Mode Pause,' through the display while recommending to 'temporarily terminate the accessibility function.'

For example, when analyzing that the intent of the user 120 is 'to request deactivation of the accessibility function,' the customized function recommendation module 115 may recommend 'termination of the accessibility function.'

According to an embodiment, when an action of the user 120 is the same as the action (or gesture) considered to recommend as a customized function is detected, the user command processing module (not shown), which may be included in the electronic device 110, may activate the customized function to execute an operation corresponding to the detected action.

For example, when the 'font size/thickness adjustment function' is activated by the selection of the user 120, the user command processing module may change the font size and style in response to the 'action of moving the screen of the electronic device 110 towards or away from the user.' The user command processing module may output a guide message, 'You may use the optimized font size and style from now on,' through the display. The user command processing module may display a function button for requesting 'setting (or configuration) complete' through the display. The word "set" and its derivations, such as setting, may be used interchangeably with the word "configure" and its derivations, such as configuration.

As an example, the user command processing module may output a guide message to provide instruction as to how to use the function through the display when the 'zoom-in (magnifying glass) function' is activated by the selection of the user 120. The guide message may be a message, 'If you press the screen twice, screen zooms in, and if you open your fingers, screen further zooms in.' The user command processing module may display a function button for requesting 'OK' through the display.

For example, when the 'sound quality optimization function' is activated by the selection of the user 120, the user command processing module may adjust the sound quality in response to the 'action of continuously manipulating the volume key provided in the electronic device 110.' The user command processing module may output a guide message, 'Please adjust the sound quality by pressing the volume button,' through the display. The user command processing module may display a function button for requesting 'setting complete' through the display.

For example, when the 'subtitle function' is activated by the selection of the user 120, the user command processing module may output the subtitle through the display.

For example, when the accessibility function is temporarily terminated by the selection of the user 120, the user command processing module may detect that the screen of the display is changed in the direction of the user 120 and then change the terminated accessibility function to the active state. The user command processing module may output a guide message, 'Re-execute the accessibility function,' through the display.

For example, when the accessibility function is temporarily terminated by the selection of the user 120, the user command processing module may detect that the screen of the display is changed in the direction of the user 120 and then change the terminated accessibility function to the active state.

For example, the user command processing module may terminate the accessibility function when the user 120 requests the termination of the accessibility function after the 'termination of the accessibility function' is recommended. The user command processing module may output a guide message, 'The black and white screen is terminated,' through the display.

Figure 2:
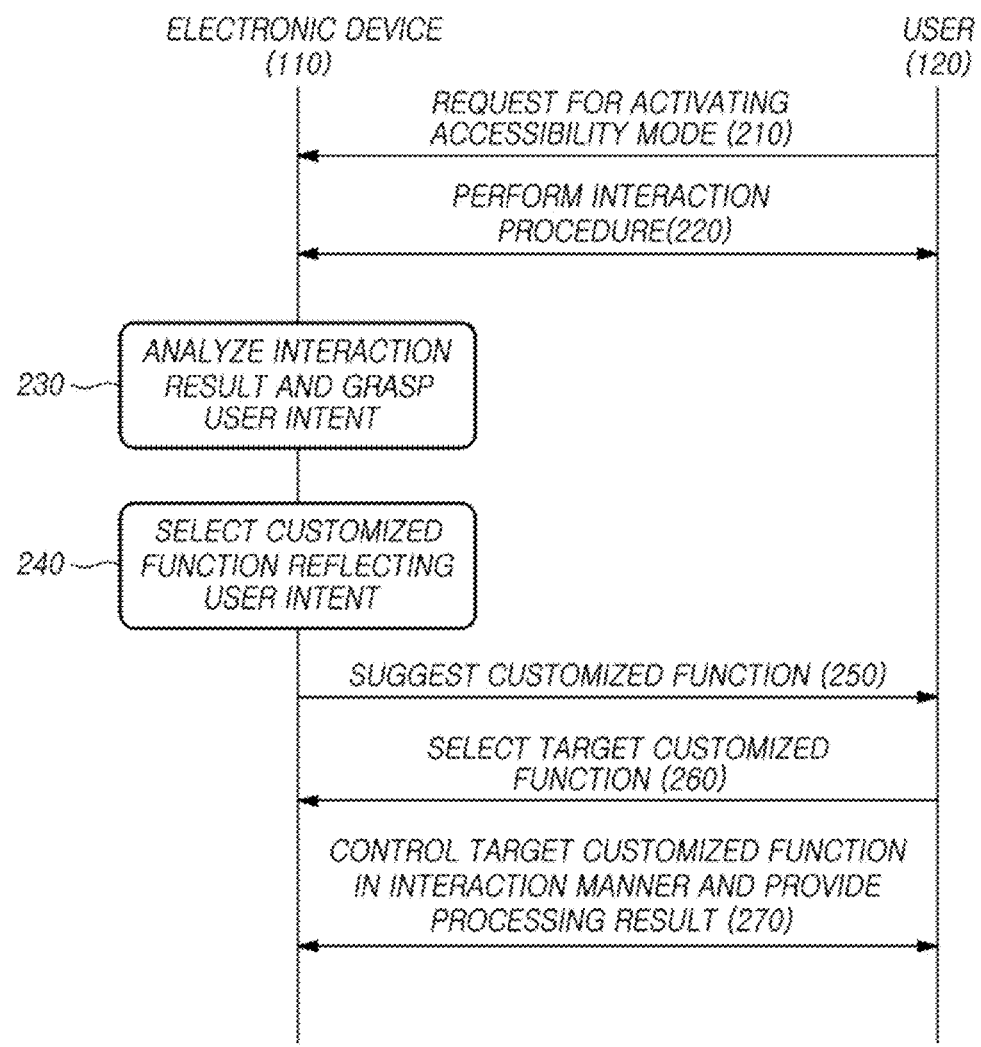
FIG. 2 is a view illustrating a procedure for suggesting a customized function to a user in an electronic device according to an embodiment.

FIG. 2 is a view illustrating a procedure in which an electronic device, e.g., the electronic device 110 of FIG. 1, suggests a customized function to a user, according to an embodiment.

Referring to FIG. 2, in operation 210, the electronic device 110 may receive a request for activating the accessibility function from the user 120. When the electronic device 110 receives a request to activate the accessibility function from the user 120, the electronic device 110 may activate the accessibility mode providing the accessibility function. The accessibility mode may be an operation mode for recognizing the user's difficulty in using the electronic device 110 and providing the function of recommending or suggesting the customized function.

Preferably, the function recommended or suggested as a customized function in the accessibility mode may target accessibility functions such as a subtitle function for the hearing impaired and a magnifying glass function for the visually impaired, which are classified as difficult to operate by the user.

For example, the electronic device 110 may execute a setting step (OOBE step) when the user turns on the power and may request the user to activate the accessibility mode in the OOBE step. In response to whether to activate, the user may choose to activate or 'skip' so as to not activate the accessibility mode.

For example, when a screen unlock event occurs, the electronic device 110 may request the user to activate the accessibility mode. For example, when the screen unlock event occurs, the electronic device 110 may display an icon for setting the accessibility mode on the screen. When the screen unlock event occurs, the electronic device 110 may display a notice on the screen—'If you want to activate the accessibility mode, press the icon to unlock it.'

For example, the electronic device 110 may provide an accessibility mode button for changing the activation state of the accessibility mode in the quick panel displayed on the screen. When the accessibility mode button is selected by the user, the electronic device 110 may output a screen, requesting the user to activate or not activate the accessibility mode. The screen for allowing the user to configure, whether to activate the accessibility mode, may include a button for activating or not activating the accessibility mode. When the corresponding button is manipulated by the user to request activation of the accessibility mode, the electronic device 110 may activate the accessibility mode to collect information about the user's action, facial expression, and the like.

For example, the electronic device 110 may output a setup menu in response to a user request. When the accessibility setting, included in the menu items, is selected by the user, the electronic device 110 may output an accessibility mode setup screen for setting the accessibility mode. The electronic device 110 may include a button for activating or not activating the accessibility mode on the accessibility mode setup screen. When the corresponding button is manipulated by the user to request activation of the accessibility mode, the electronic device 110 may activate the accessibility mode to collect information about the user's action, facial expression, and the like.

In operation 220, the electronic device 110 may perform an interaction procedure with the user 120. The electronic device 110 may execute an interaction procedure with the user 120 to collect reference data in order to obtain the customized function to suggest. The reference data for suggesting the customized function may be data about a repetitive action by the user 120, a change in the facial expression of the user 120, or a movement of the electronic device 110. The information about the repetitive action by the user 120 may be obtained by the electronic device 110 interacting with the user 120. The interaction with the user 120 may be executed using at least one of a detection signal provided by at least one sensor, e.g., a gesture sensor, included in a sensor module, e.g., the sensor module 930 of FIG. 9, and/or image data provided by a camera module, e.g., the camera module 920 of FIG. 9. Information about the change in the facial expression of the user may be obtained using, e.g., vision recognition technology using image data provided by the camera module 920. The information about the movement of the electronic device 110 may be obtained using a detection signal provided by at least one sensor, e.g., a gyro sensor, an acceleration sensor, or an inertial measurement unit (IMU) sensor, included in the sensor module 930.

In operation 230, the electronic device 110 may analyze the result of the interaction performed with the user 120 and may determine the user intent using the analysis result. For example, the electronic device 110 may identify the action repeated by the user 120 through the interaction with the user 120. When the electronic device 110 detects the repetitive action of the user 120, the electronic device 110 may analyze the intent of the user 120 corresponding to the detected action of the user 120. For example, if it is identified that the same action of the user 120 is repeated two or more times within a specified number of seconds, the electronic device 110 may predict that there is a function desired by the user 120 but it is difficult to execute the function. As another example, the electronic device 110 may analyze the intent of the user 120 considering the collected context information, the action (gesture) of the user 120 or the change in the facial expression of the user 120.

In operation 240, the electronic device 110 may select the customized function reflecting the user's intent. For example, the electronic device 110 may obtain one or more customized functions to be recommended for the analyzed intent of the user 120 from the user action intent list, e.g., see Table 2 below. For example, an initial version of the user action intent list may be preset (or preconfigured). The user action intent list may be updated with information about the user's action type, facial expression type, or user's intent through learning.

In operation 250, the electronic device 110 may provide information about the selected one or more customized functions to the user 120, e.g., the customized function suggestion 140 of FIG. 1. The method of providing information about the selected one or more customized functions to the user 120 may be displayed, for example, as a pop-up message on the screen.

In operation 260, the electronic device 110 may receive information about selecting a target customized function from the user 110. For example, the electronic device 110 may determine whether at least one target customized function is selected by the user. When at least one target customized function is selected by the user, the electronic device 110 executes the selected target customized function to perform at least one customized function desired by the user. For example, when the target customized function selected by the user is a 'zoom-in' function, the electronic device 110 may zoom in the screen being output. As an example, when the target customized function selected by the user is the 'subtitle description' function, the electronic device 900 may display a subtitle at the lower end of the image being output through the screen.

In operation 270, the electronic device 110 may control the target customized function through an interaction with the user 120 and may provide the result of processing the target customized function to the user 120. According to an embodiment, when an action of the user 120 that is the same as the action (or gesture) considered to recommend a customized function is detected, the electronic device 110 may activate the customized function to execute an operation corresponding to the detected action.

For example, when the 'font size/thickness adjustment function' is activated by the selection of the user 120, the electronic device 110 may change the font size and style in response to the 'action of moving the screen of the electronic device 110 towards or away from the user.' The electronic device 110 may output a guide message, 'You may use the optimized font size and style from now on', through the display. The electronic device 110 may display a function button for requesting 'setting complete' through the display.

As an example, the electronic device 110 may output a guide message guiding to how to use the function through the display when the 'zoom-in (magnifying glass) function' is activated by the selection of the user 120. The electronic device 110 may output a guide message, 'If you press the screen twice, the image becomes larger, and if you widen your fingers, the image becomes even larger.' For example, when the 'sound quality optimization function' is activated by the selection of the user 120, the electronic device 110 may adjust the sound quality in response to the 'action of continuously manipulating the volume key provided in the electronic device 110.' The electronic device 110 may output, e.g., a guide message, 'Please adjust the sound quality by pressing the volume button,' through the display. For example, when the 'subtitle function' is activated by the selection of the user 120, the electronic device 110 may output the subtitle through the display. For example, when the accessibility function is temporarily terminated by the selection of the user 120, the electronic device 110 may detect that the screen of the display is changed in the direction of the user 120, and then change the terminated accessibility function to the active state. For example, when the accessibility function is temporarily terminated by the selection of the user 120, the electronic device 110 may detect that the screen of the display is changed in the direction of the user 120, and then change the terminated accessibility function to the active state. For example, the electronic device 110 may terminate the accessibility function when the user 120 requests the termination of the accessibility function after the 'termination of the accessibility function' is recommended. The electronic device 110 may output a guide message, 'The black and white screen is terminated,' through the display.

Figure 3:
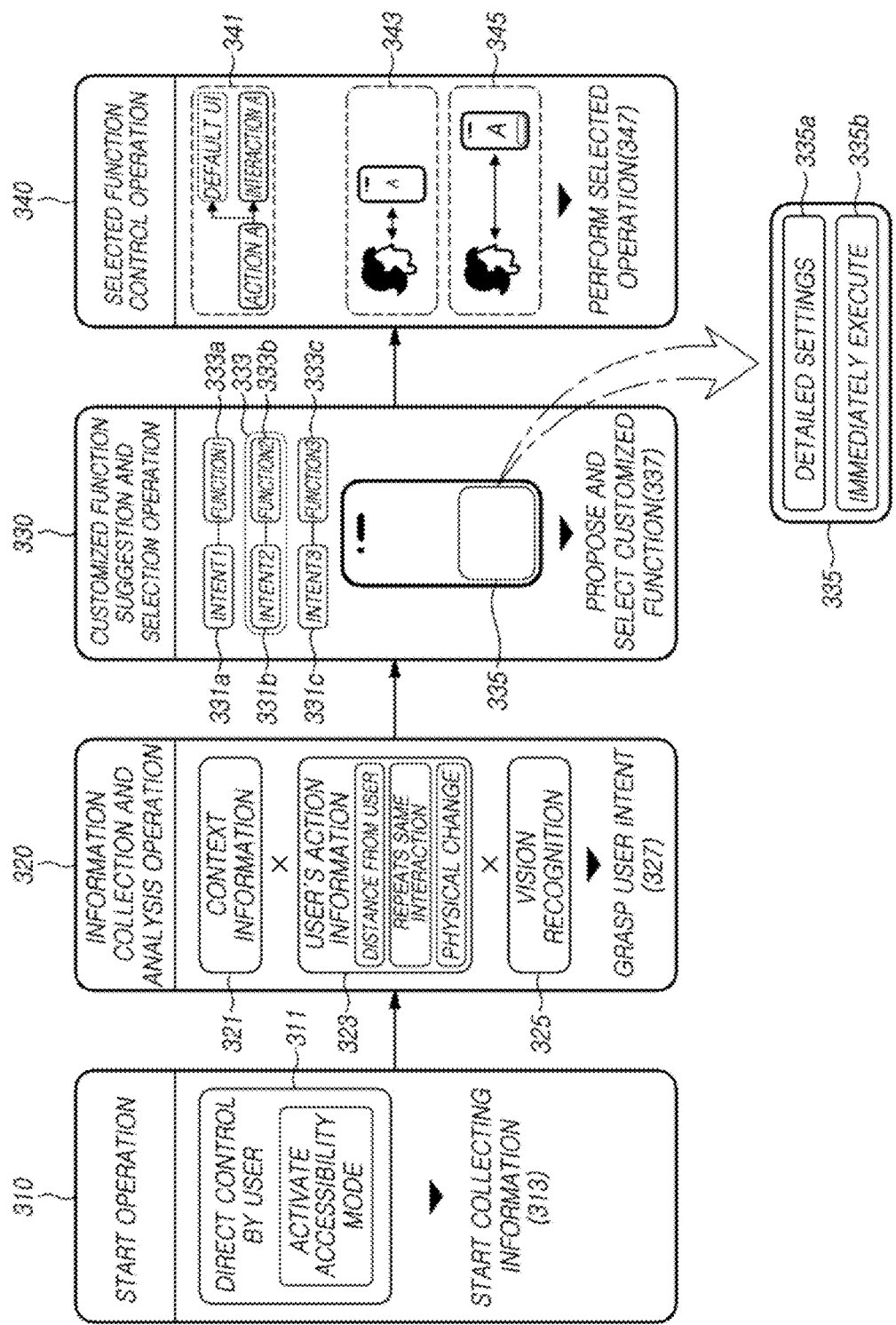
FIG. 3 is a view illustrating stepwise operations for performing a selected customized function from among recommended customized functions considering a user's intention in an electronic device according to an embodiment.

FIG. 3 is a view illustrating stepwise operations for performing a selected customized function from among recommended customized functions considering the user's intention in an electronic device, e.g., the electronic device 110 of FIG. 1, according to an embodiment.

Referring to FIG. 3, the same defines a stepwise operation 310 that may be performed by the electronic device 110 when an event for requesting activation of an accessibility function occurs. A user, e.g., the user 120 of FIG. 1, may directly set activation of the accessibility mode (311). When the accessibility mode is activated by the user 120, the electronic device 110 may start (310) collecting information for supporting a function according to the accessibility mode.

Referring to FIG. 3, the same defines a stepwise operation (320) for collecting and analyzing information that may be performed by the electronic device 110 when the accessibility function is activated. According to an embodiment, the electronic device 110 may collect (321) context information. The electronic device 110 may collect user action information (323). The electronic device 110 may collect information about changes in the facial expression of the user through vision recognition (325). The action information about the user may include, e.g., information about a distance to the user, repetition of the same interaction, or a physical change. The electronic device 110 may determine the user's intent based on the collected information (327).

Referring to FIG. 3, the same defines a stepwise operation in which the electronic device 110 suggests a customized function and the user selects a target customized function (330). According to an embodiment, the user's intent 1 331a, intent 2 331b, and intent 3 331c may be analyzed based on the collected information. Function 1 333a, function 2 333b, and function 3 333c may be selected as the customized functions to be recommended corresponding to the analyzed intent 1 331a, intent 2 331b, and intent 3 331c, respectively. The user 120 may select one function, e.g., function 2 333b, from among function 1 333a, function 2 333b, and function 3 333c suggested to the user 120. For example, the user 120 may select function 2 333b. The electronic device 110 may provide the user with a setup screen 335 for the selected function 2 333b. The setup screen 335 may include a detailed setting button 335a or a direct execution button 335b.

Referring to FIG. 3, the same defines a stepwise operation for controlling the selected customized function (340). The electronic device 110 may provide control by the default UI in response to the user's action A. The electronic device 110 may provide control by interaction A corresponding to action A of the user (341). For example, in the case of the control by the interaction, the user may perform the control operation for the customized function selected by the action of moving away from (345) and moving towards (343) the electronic device 110.

Figure 4:
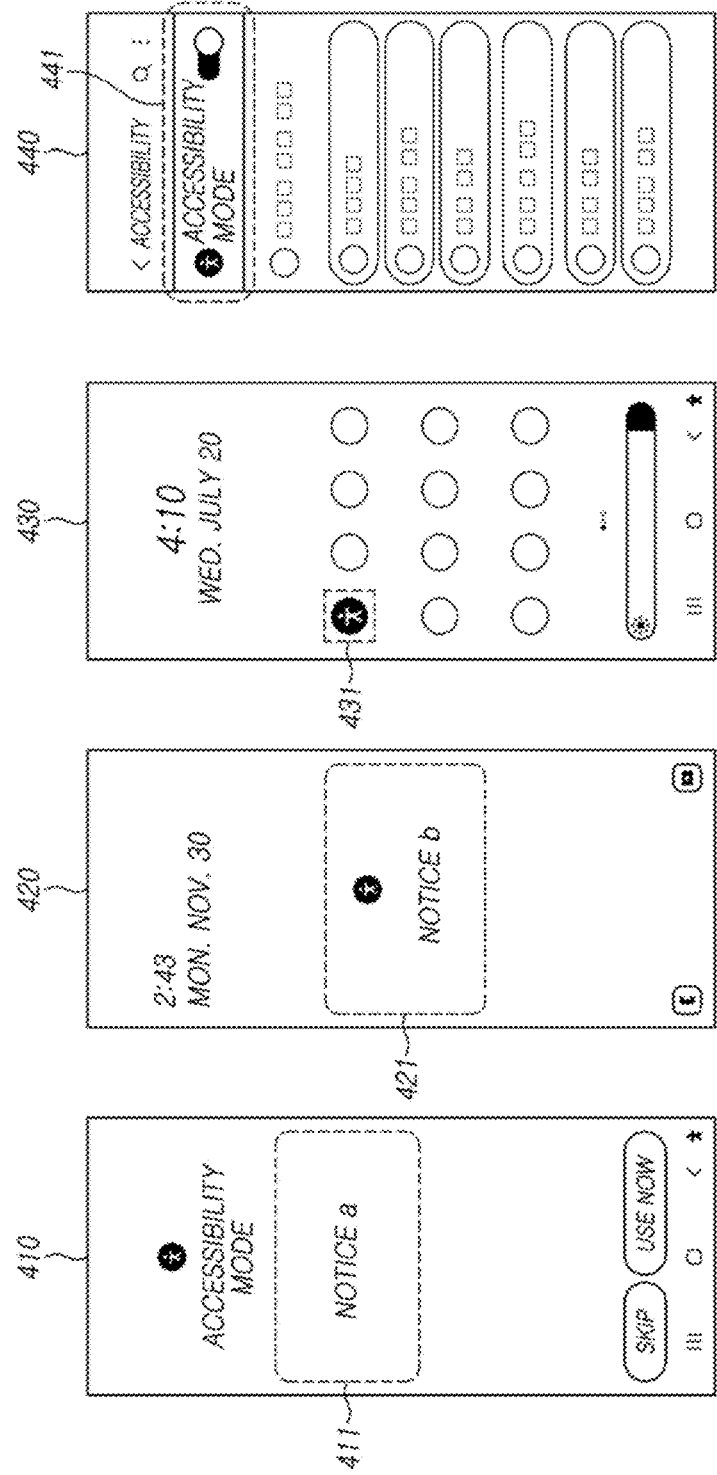
FIG. 4 is a view illustrating a screen capable of configuring an accessibility function in an electronic device according to an embodiment.

FIG. 4 is a view illustrating an example screen for setting an accessibility function in an electronic device, e.g., the electronic device 110 of FIG. 1, according to an embodiment.

Referring to FIG. 4, the same illustrates a screen 410 in which the electronic device 110 executes a setting step (OOBE step) when the user turns on power. For example, in the OOBE step, the electronic device 110 may request the user to activate the accessibility mode. The screen 410 may include a notice a 411, 'If the accessibility mode is activated, you can recognize difficulty in using the device and receive a recommendation for a customized function.' The screen 410 may include a 'Use Now' function button for allowing the user 120 to select activation of the accessibility mode. The screen 410 may include a 'skip' function button to allow the user 120 to not activate the accessibility mode.

Referring to FIG. 4, the same shows a screen 420 in which the electronic device 110 may request the user to select whether to activate the accessibility mode in response to the occurrence of the screen unlock event. For example, when the screen unlock event occurs, the electronic device 110 may display an icon for setting the accessibility mode on the screen. When the screen unlock event occurs, the electronic device 110 may display a notice b 421 on the screen 420—'If you want to activate the accessibility mode, press the icon to unlock it.'

Referring to FIG. 4, the same shows a screen 430 in which the electronic device 110 provides an accessibility mode button for changing the activation state of the accessibility mode in the quick panel displayed on the screen. For example, when the accessibility mode button 431 is selected by the user, the electronic device 110 may output a screen requesting the user to select whether to activate the accessibility mode. The screen for allowing the user to set activation of the accessibility mode may include a button for activating or deactivating the accessibility mode.

Referring to FIG. 4, the same shows a screen 440 in which the electronic device 110 displays a setup menu in response to a request from the user 120. For example, when the accessibility setting included in the menu items is selected by the user 120, the electronic device 110 may output an accessibility mode setup screen 440 for setting the accessibility mode. The accessibility mode setup screen may include a button 441 for activating or deactivating the accessibility mode. When the corresponding button 441 is manipulated by the user 120 to request activation of the accessibility mode, the electronic device 110 may activate the accessibility mode to collect information about the user's action, facial expression, and the like.

Figure 5:
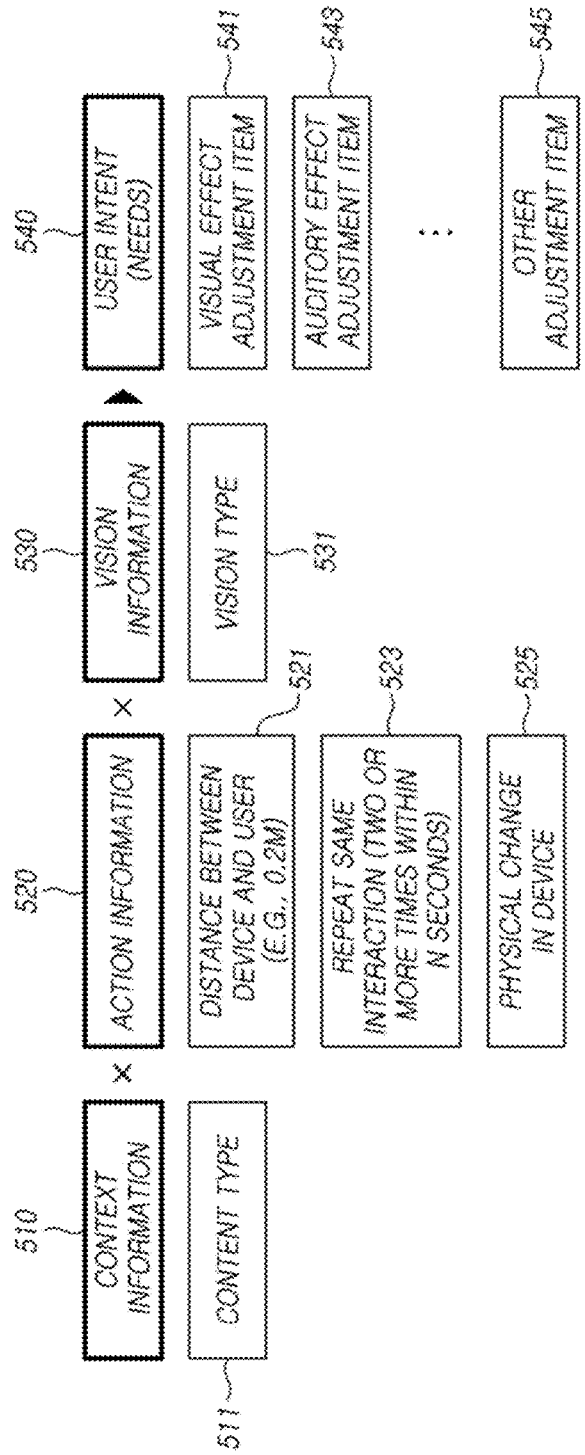
FIG. 5 is a view illustrating a stepwise procedure for collecting information for analyzing a user's intent in an electronic device according to an embodiment.

FIG. 5 is a view illustrating a stepwise procedure for collecting information to analyze an intent of a user, e.g., the user 120 of FIG. 1, in an electronic device, e.g., the electronic device 110 of FIG. 1, according to an embodiment.

Referring to FIG. 5, context information 510 is information about the type of content (511) being used by the user 120 in the electronic device 110. For example, as defined in Table 1 below, the content information 510 may be one of text, an image, a video, a voice, a sound, a button input, or a layout-fixed screen.

The action information 520 may be information about the actions (gestures/movements) of the user obtained by the electronic device 110. The information about the action may be obtained when the user repeats the same action for a specified period of time. The action information 520 may include information about a distance 521, e.g., 0.2 m, between the device and the user. The action information 520 may include information related to the repetition 523 of the same interaction (repeat at least twice within a certain number of seconds). The action information 520 may include information about a change 525, such as a physical movement of the electronic device 110.

The vision information 530 may be information about a facial expression change obtained through facial recognition of the user. The vision information 530 may include a vision type 531. The vision type 531 may include information about changes such as frowning, taking off glasses, or putting on sunglasses.

The user intent 540 may be determined by analyzing at least one of the previously collected content information 510, the action information 520, or the vision information 530. The user intent 540 may include, e.g., a visual effect adjustment item 541, an auditory effect adjustment item 543, or other items 545.

Figure 6A:
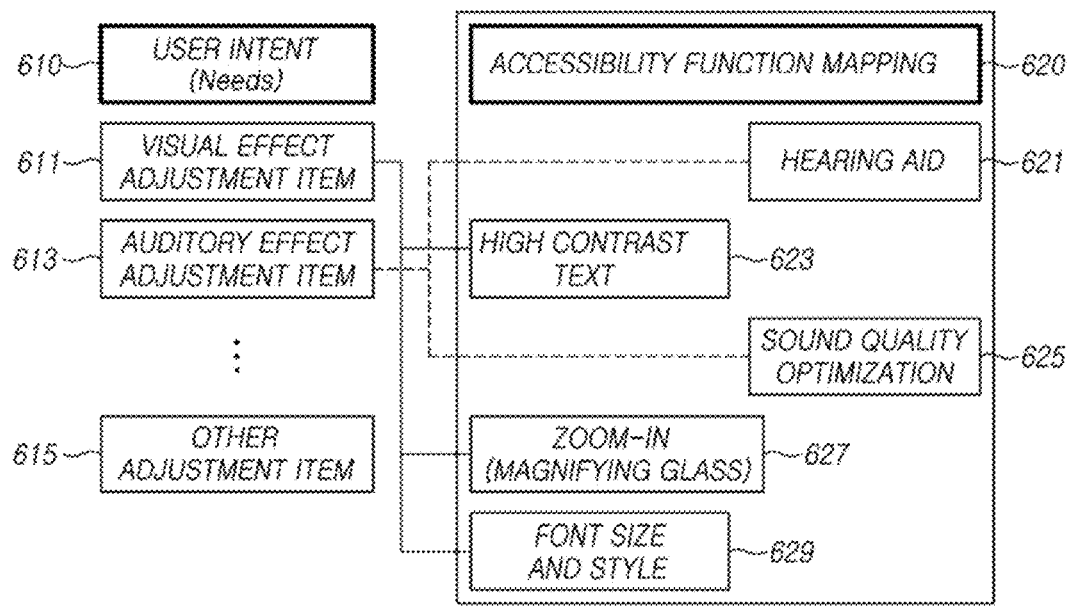
FIGS. 6A and 6B are views illustrating an example of mapping a customized function for each user intent in an electronic device according to an embodiment.
Figure 6B:
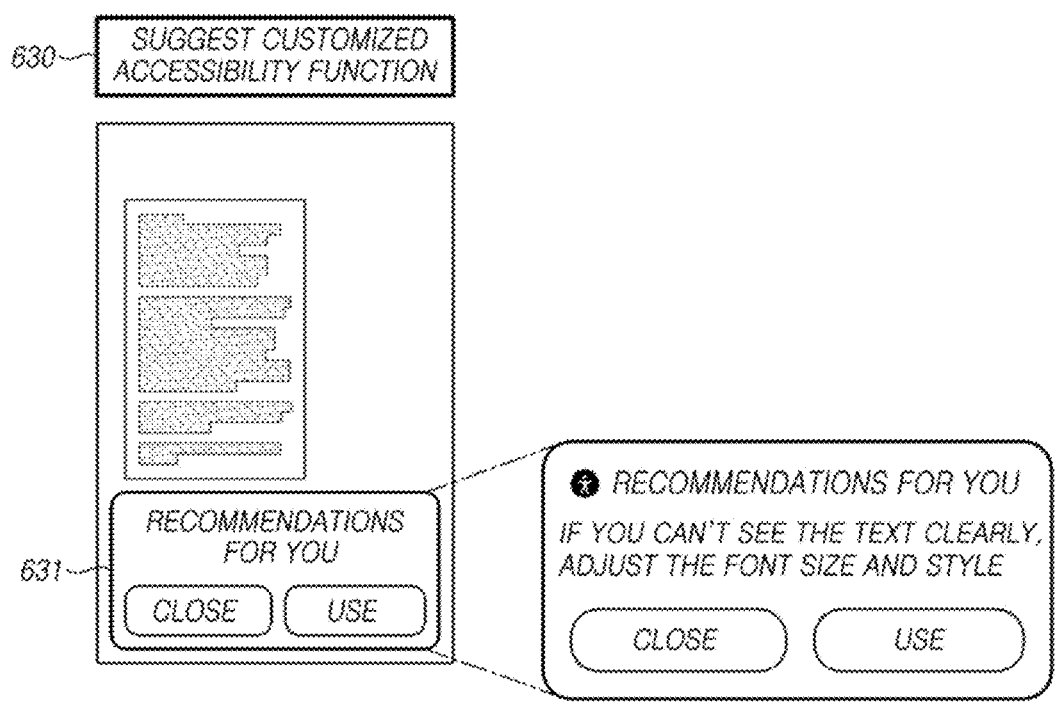

FIGS. 6A and 6B are views illustrating an example of mapping a customized function for each user intent in an electronic device, e.g., the electronic device 110 of FIG. 1, according to an embodiment.

Referring to FIG. 6A, a user intent 610 that may be analyzed by the electronic device 110 may include a visual effect adjustment item 611, an auditory effect adjustment item 613, or other adjustment items 615.

The accessibility function 620 may include an accessibility function regarding each of a vision aid function, a high contrast text 623, a zoom-in (magnifying glass) 627, or a font size and style 629 that may be mapped corresponding to the visual effect adjustment item 611 included in the user intent 610. The accessibility function 620 includes an accessibility function for each of the hearing aid 621 or the sound quality optimization 625, which is an accessibility function that may be mapped corresponding to the auditory effect adjustment item 613 included in the user intent 610.

As illustrated in FIG. 6B, the electronic device 110 may suggest a customized accessibility function (630). For example, the electronic device 110 may provide the message 631 informing the user of the reason for suggesting the corresponding customized accessibility function. The message 631 may include a phrase, 'Adjust the font size and style if you can't see the text clearly.' The electronic device 110 may provide the user with function buttons, e.g., short-term, use, for selecting whether to use the corresponding accessibility function.

Figure 7:
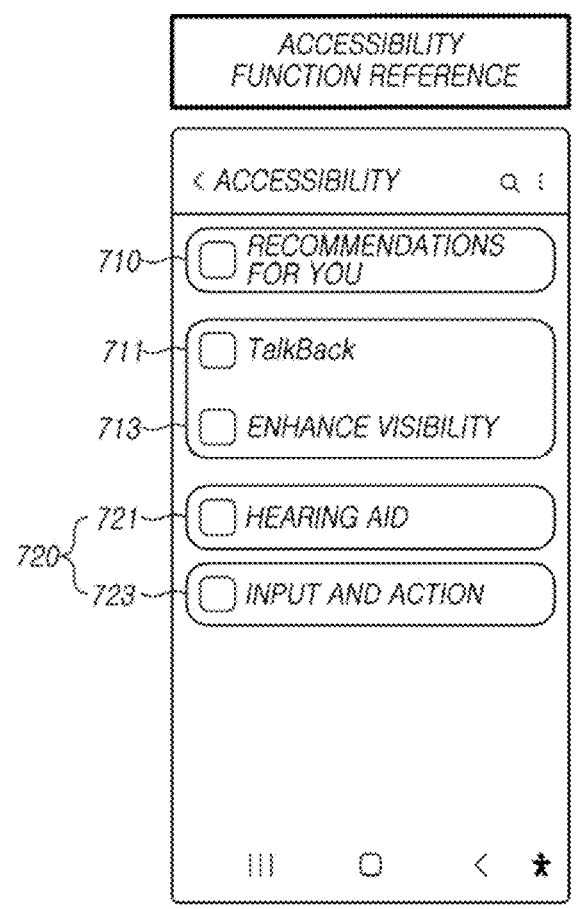
FIG. 7 is a view illustrating a screen for providing accessibility function-related information to a user in an electronic device according to an embodiment.

FIG. 7 is a view illustrating a screen for providing accessibility function-related information to the user in an electronic device, e.g., the electronic device 110 of FIG. 1, according to an embodiment.

Referring to FIG. 7, an accessibility function reference screen includes 'TalkBack' 711 or 'enhance visibility (713)' as a customized function 710 recommended for the user. Although not currently recommended, the accessibility function 720, which can be selected by the user 120, includes a 'hearing aid 721' function or an 'input and action' function.

FIGS. 8A, 8B, 8C and 8D are views illustrating stepwise screens of controlling a target customized function through an interaction in an electronic device, e.g., the electronic device 110 of FIG. 1, according to an embodiment.

Figure 8A:
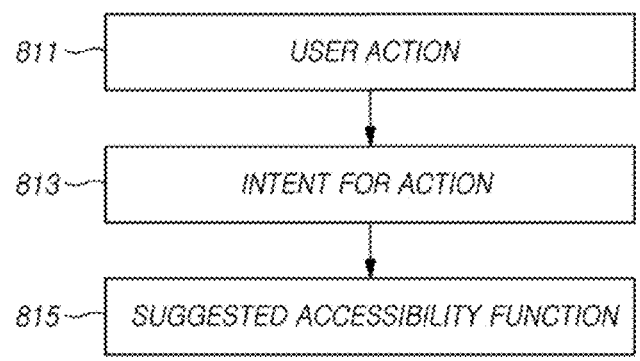
FIGS. 8A, 8B, 8C and 8D are views illustrating stepwise screens of controlling a target customized function through interaction in an electronic device according to an embodiment.

Referring to FIG. 8, FIG. 8A illustrates a stepwise procedure in which the electronic device 110 recommends an accessibility function based on an interaction with the user. The stepwise procedure may include a user action step 811, an intent determination step 813 for an action, or an accessibility function suggestion step 815.

For example, in the user action step 811, the electronic device 110 may collect information about the user's action and/or information about a change in the user's facial expression. For example, the user's action may be moving the screen of the electronic device towards (or closer to) and/or away from the user. The change in facial expression may be frowning or squinting by the user when looking at the text content on the screen of the electronic device.

According to an embodiment, in step 813 of determining the intent for the action, the electronic device 110 may analyze the information collected in the user action operation 811 and may determine the intent of the user taking the action based on the result of analyzing the information. For example, based on the collected data, the electronic device 110 may analyze that the user's intent is 'to see the text clearly' when looking at the screen, which relates to the action of the user moving the screen of the electronic device 110 towards or away from the user and/or lifting/adjusting the glasses worn by the user.

For example, in the accessibility function suggestion step 815, the electronic device 110 may determine one or more accessibility functions to be suggested to the user considering the user's intent determined in the action intent determination step 813. For example, when analyzing that the intent of the user is to see the text clearly, the electronic device 110 may determine the font size/thickness adjustment function as an accessibility function to be suggested. The 'font size/thickness adjustment function' may provide an operation of adjusting the font size and/or style suitable for the user.

Figure 8B:
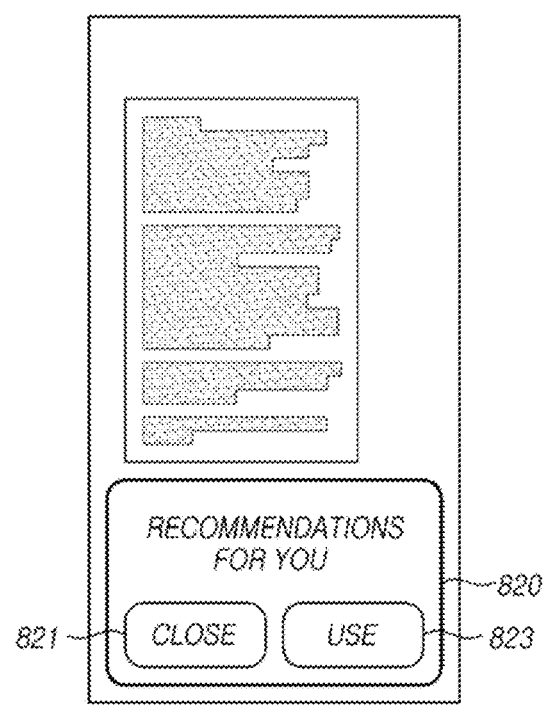

According to an embodiment, in FIG. 8B, a screen in which the electronic device 110 provides a related guide message 820 while suggesting an accessibility function is shown. For example, the electronic device 110 may analyze that the user's intent is 'to see the text clearly' and recommend 'the font size/thickness adjustment function' in a form of a guide message 820, 'adjust the font size and style if you can't see the text clearly,' through the display. The electronic device 110 may display, together with the guide message 820, a 'use' function button 823 to activate the 'font size/thickness adjustment function.' The electronic device 110 may display, together with the guide message 820, a 'close' function button 821 to not activate the 'font size/thickness adjustment function.'

Figure 8C:
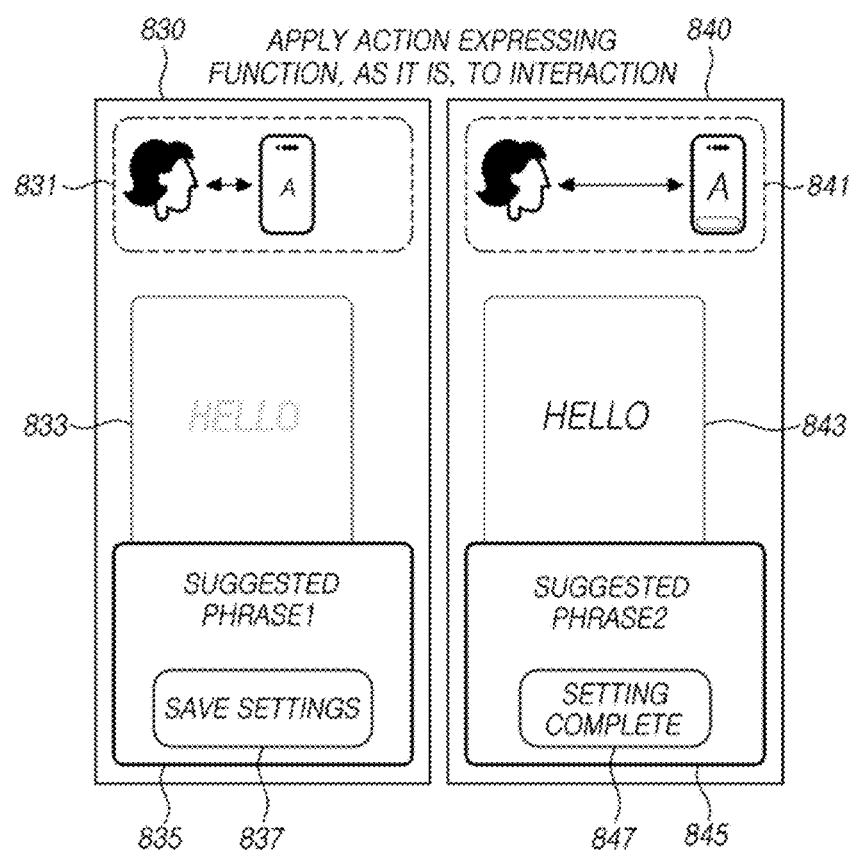

According to an embodiment, in FIG. 8C, screens 830 and 840 show the functions of the electronic device 110 as applied in an interaction. Types 831 and 841 of actions taken by the user to control the corresponding accessibility function may be displayed on the screens 830 and 840. The screens 830 and 840 may include text 833 and 843 or suggested phrases 835 and 845 whose size/thickness is adjusted according to the action types 831 and 841. The second screen 840 may be provided when the user selects to apply the adjusted option on the first screen 830.

For example, when the user performs the operation 831 corresponding to moving the screen towards the user, the electronic device 110 may adjust the size/thickness of the text 833 displayed on the first screen 830 corresponding to the user's action 831. The first screen 830 may include a suggested phrase 1, e.g., 'If you move the screen forward and backward, find the optimal font size and stye.' The first screen 830 may include a 'Save Settings' function button 837 to request to store the adjusted size/thickness as a setting.

For example, when the user performs the operation 841 corresponding to moving the screen away from the user, the electronic device 110 may adjust the size/thickness of the text 843 displayed on the second screen 840 corresponding to the user's action 841. The screen 840 may include a suggested phrase 2, e.g., 'The optimized font size and style can be used from now.' The second screen 840 may include a 'Settings complete' function button 847 to request to determine the setting as the adjusted size/thickness.

Figure 8D:
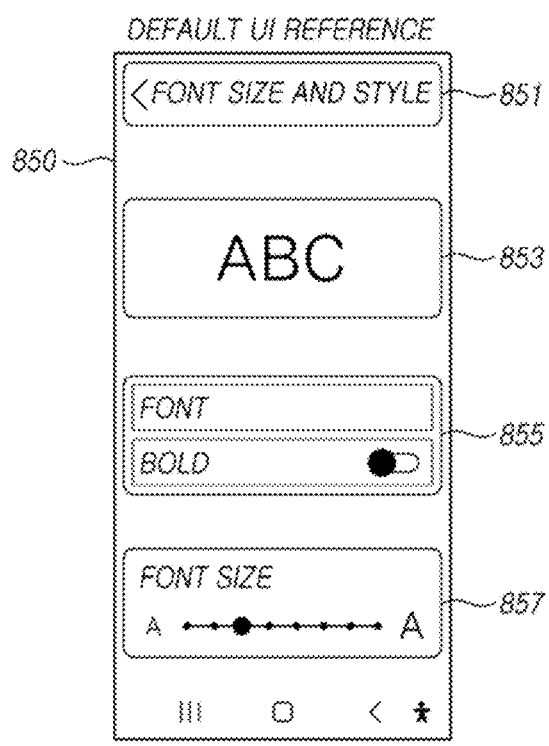

According to an example, in FIG. 8D, the screen 850 of the general UI in which the user may directly manipulate the screen setting, rather than an interaction, is shown. For example, the screen 850 may include an indication 850 indicating that the adjustment target item is the font size and style. The screen 850 may include an example phrase 853 reflecting the font size and/or style according to the current setting (or configuration). The screen 850 may include a first function button 855 capable of setting the font style. The screen 850 may include a second function button 857 capable of setting the font size. The user may directly manipulate the first function button 855 to set a desired font style. The user may directly manipulate the second function button 857 to set a desired font size.

Figure 9:
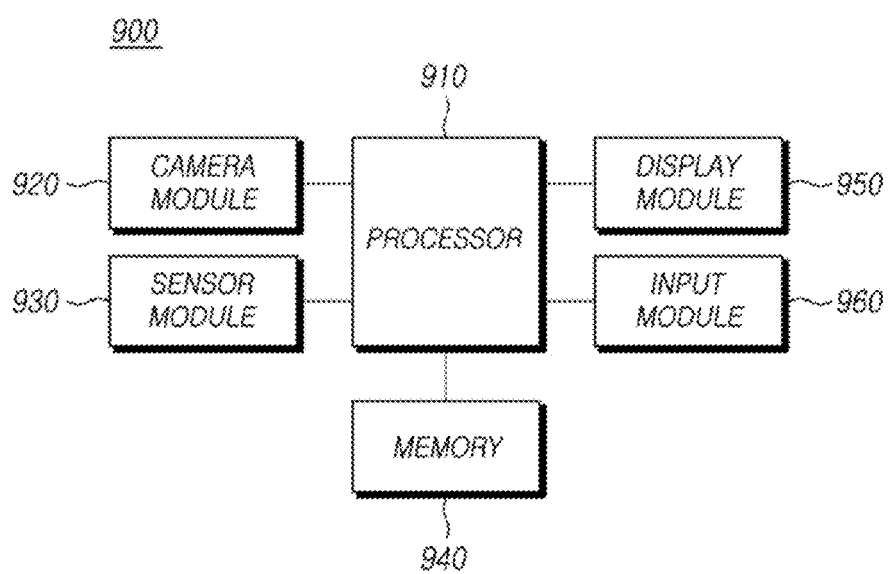
FIG. 9 is a block diagram illustrating an electronic device according to an embodiment.

FIG. 9 is a block diagram illustrating an electronic device 900, e.g., the electronic device 110 of FIG. 1, according to an embodiment.

Referring to FIG. 9, an electronic device 900 may include a processor 910, a camera module 920, a sensor module 930, a memory 940, a display module 950, or an input module 960. Although not shown in the drawings, at least one, e.g., the input module 960, of the components may be omitted from the electronic device 900 or one or more other components may be added in the electronic device 101. Some of the components, e.g., the sensor module 930, the camera module 920, or the input module 960, may be integrated into a single component, e.g., the display module 950.

The processor 910 may execute a software, e.g., a program, to control at least one other component, e.g., a hardware or software component, of the electronic device 900 connected with the processor 910. The processor 910 may perform various data processing or computations. According to one embodiment, as at least a part of the data processing or computations, the processor 910 may store commands or data received from another component, e.g., the sensor module 930, in the memory 940, e.g., volatile memory. The processor 910 may process the commands or data stored in the memory 940. The processor 910 may store command or data processing result data in the memory 940.

According to an embodiment, the processor 910 may include a main processor, e.g., a central processing unit (CPU) or an application processor (AP), or an auxiliary processor, e.g., a graphics processing unit (GPU), a neural processing unit (NPU), an image signal processor (ISP), a sensor hub processor, or a communication processor (CP), that is operable independently from, or in conjunction with, the main processor 121. For example, when the electronic device 900 includes the main processor and the auxiliary processor, the auxiliary processor may be configured to use lower power than the main processor or to be specified for a designated function. The auxiliary processor may be implemented separately from, or as a part of, the main processor.

The auxiliary processor may control, e.g., at least some of functions or states related to at least one component, e.g., the display module 950 or the sensor module 930, among the components of the electronic device 900 instead of the main processor while the main processor is in an inactive state, e.g., sleep state. For example, the auxiliary processor may control at least some of functions or states related to at least one component, e.g., the display module 950 or the sensor module 930, among the components of the electronic device 900, along with the main processor while the main processor is an active state, e.g., executing an application. As another example, the auxiliary processor, e.g., an image signal processor or a communication processor, may be implemented as a part of another component, e.g., the camera module 920, functionally related to the auxiliary processor 123. As another example, the auxiliary processor, e.g., the neural processing unit, may include a hardware structure specified for artificial intelligence model processing. The artificial intelligence model may be generated via machine learning. Such learning may be performed, e.g., by the electronic device 900 where the artificial intelligence is performed or via a separate server. Learning algorithms may include, but are not limited to supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The camera module 920 may capture a still image or moving images. The camera module 920 may include one or more of lenses, image sensors, image signal processors, or flashes.

The sensor module 930 may detect an operational state, e.g., power or temperature, of the electronic device 900 or an external environmental state, e.g., the user's state. The sensor module 930 may generate an electrical signal or data value corresponding to the detected state. The sensor module 930 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The memory 940 may store various data used by at least one component, e.g., the processor 910 or the sensor module 930, of the electronic device 900. The various data may include, for example, software, e.g., the program, and input data or output data for a command related thereto. The memory 940 may include a volatile memory or a non-volatile memory. The program that may be stored as software in the memory 940 may include an operating system, middleware, or applications.

The display module 950 may visually provide information to the external source, e.g., a user, of the electronic device 900. The display 950 may include, for example, a display, a hologram device, or a projector and control circuitry to control a corresponding one of the display, hologram device, and projector. The display module 950 may include a touch sensor configured to detect a touch, or a pressure sensor configured to measure the intensity of a force generated by the touch.

The input module 960 may receive a command or data to be used by other component, e.g., the processor 910, of the electronic device 900, from an external source, e.g., a user, of the electronic device 900. The input module 960 may include, for example, a microphone, a mouse, a keyboard, keys, e.g., buttons, or a digital pen, e.g., a stylus pen.

According to an embodiment, instructions or data may be transmitted or received between the electronic device 900 and the external electronic device via the server connected to the network. The external electronic device may be a device of the same or a different type as/from the electronic device 900. As an example, all or some of the operations executed on the electronic device 900 may be executed on one or more external electronic devices among external electronic devices. For example, if the electronic device 900 should perform a function or a service automatically, or in response to a request from a user or another device, the electronic device 900, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 900. The electronic device 900 may provide the outcome, with or without further processing of the outcome, as at least part of a reply to the request. To that end, a cloud computing, distributed computing, mobile edge computing (MEC), or client-server computing technology may be used, for example. The electronic device 900 may provide ultra low-latency services using, e.g., distributed computing or mobile edge computing. As an example, the external electronic device may include an Internet-of-things (IoT) device. The server may be an intelligent server using machine learning and/or a neural network. According to one example, the external electronic device or server may be included in the network. The electronic device 900 may be applied to intelligent services, e.g., smart home, smart city, smart car, or healthcare, based on 5G communication technology or IoT-related technology.

According to an example, the processor 910 may detect context information for classifying the category of the app being used by the user. The context information may include a text content page activation state, a state in which a page in which a screen is not enlarged is being output, a state in which a call is being made, a state in which a video is being viewed, or a state in which a specific accessibility function is being executed.

The processor 910 may perform an interaction with the user, e.g., the user 120 of FIG. for the interaction 130 of FIG. 1, to detect an action (gesture) or a change in facial expression of the user 120. The processor 910 may analyze the intent of the user 120 considering the collected context information, the action (gesture) of the user 120, or the change in the facial expression of the user 120.

The processor 910 may obtain one or more customized functions to be recommended based on the analyzed intent of the user 120 from the user action intent list, e.g., see Table 2 below. For example, an initial version of the user action intent list may be preset (or preconfigured). For example, the user action intent list may be updated with information about the user's action type, facial expression type, or user's intent through learning. The processor 910 may provide information about the obtained one or more customized functions to the user 120, e.g., the customized function suggestion 140 of FIG. 1. The processor 910 may output the obtained information regarding one or more customized functions through the display module 950 and provide the information to the user 120.

Figure 10:
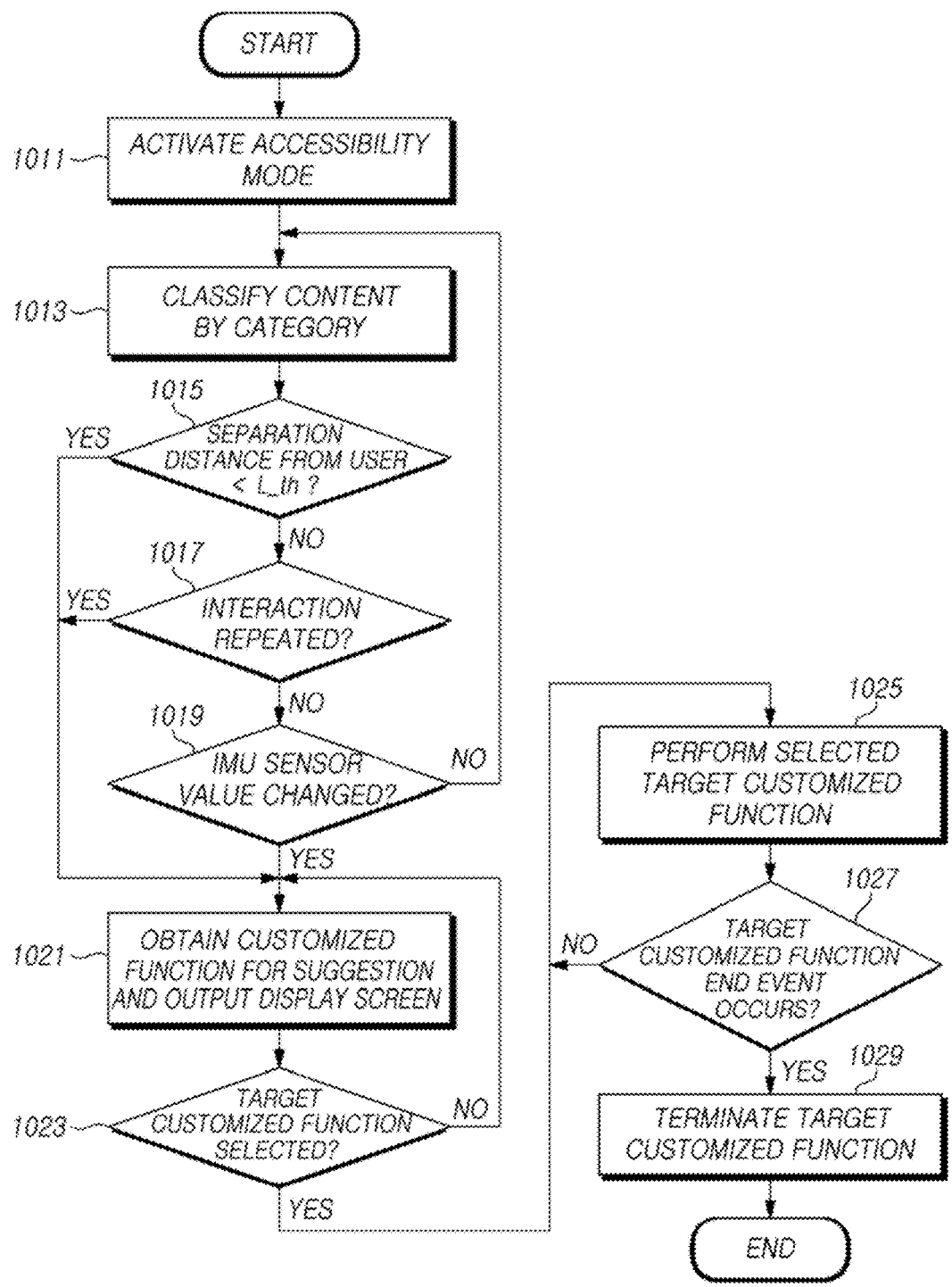
FIG. 10 is a control flowchart for providing a customized accessibility function to a user in an electronic device according to an embodiment.

FIG. 10 is a control flowchart for providing a customized accessibility function to a user in an electronic device, e.g., the electronic device 110 of FIG. 1 or the electronic device 900 of FIG. 9, according to an embodiment.

Referring to FIG. 10, in operation 1011, the electronic device 900 may activate an accessibility mode. The accessibility mode may be an operation mode for recognizing the user's difficulty in using the electronic device 900 and providing the function of recommending or suggesting the customized function. Preferably, the function recommended or suggested as a customized function in the accessibility mode may target accessibility functions such as a subtitle function for the hearing impaired and a magnifying glass function for the visually impaired, which are classified as difficult to operate by the user.

For example, the electronic device 900 may execute a setting step (OOBE step) when the user turns on the power. In the OOBE step, the electronic device 900 may request the user whether to activate or deactivate the accessibility mode. The user may choose to activate or 'skip' so as to not activate the accessibility mode.

For example, when a screen unlock event occurs, the electronic device 900 may request the user to activate the accessibility mode. For example, when the screen unlock event occurs, the electronic device 900 may display an icon for setting the accessibility mode on the screen. When the screen unlock event occurs, the electronic device 900 may display a notice on the screen, 'If you want to activate the accessibility mode, press the icon to unlock it.'

For example, the electronic device 900 may provide an accessibility mode button for changing the activation state of the accessibility mode in the quick panel displayed on the screen. When the accessibility mode button is selected by the user, the electronic device 900 may output a message on a screen requesting the user to activate the accessibility mode. The screen for allowing the user to set whether to activate the accessibility mode may include a button for selecting activation of the accessibility mode or deactivation of the accessibility mode. When the corresponding button is manipulated by the user to request activation of the accessibility mode, the electronic device 900 may activate the accessibility mode to collect information about the user's action, facial expression, and the like.

For example, the electronic device 900 may output a menu setting in response to a user request. When the accessibility setting included in the menu items is selected by the user, the electronic device 900 may output an accessibility mode setup screen for setting the accessibility mode. The electronic device 900 may include a button for selecting activation or deactivation of the accessibility mode on the accessibility mode setup screen. When the corresponding button is manipulated by the user to request activation of the accessibility mode, the electronic device 900 may activate the accessibility mode to collect information about the user's action, facial expression, and the like.

When the accessibility mode is active, in operation 1013, the electronic device 900 may classify content available to the user by category according to types. The category may include the screen, e.g., the web or the app, to which the text, the image, the image, the voice, the sound, the button operation, or the layout is fixed. As an example, the electronic book function may be classified as a category corresponding to a text and/or an image. As another example, the voice call function may be classified as a category corresponding to voice or sound. Classifying the contents by category is intended to enable easier selection of a customized function to be suggested by referencing the category of a specific function when an event requiring recommendation of a customized function occurs in a situation where the user is using the specific function.

The electronic device 900 may collect information to use as basis for providing the customized function to suggest/recommend in operations 1015 to 1019. The information to use as basis for suggesting the customized function may be, e.g., information about a repetitive action by the user, a change in the facial expression of the user, or a movement of the electronic device 900. The information about the repetitive action by the user may be obtained by the electronic device 900 interacting with the user. The interaction with the user may be executed using at least one of a detection signal provided by at least one sensor, e.g., a gesture sensor, included in a sensor module, e.g., the sensor module 930 of FIG. 9, and/or image data provided by a camera module, e.g., the camera module 920 of FIG. 9. Information about the change in the facial expression of the user may be obtained using, e.g., vision recognition technology using image data provided by the camera module 920. The information about the movement of the electronic device 900 may be obtained using, e.g., a detection signal provided by at least one sensor, e.g., a gyro sensor, an acceleration sensor, or an IMU sensor, included in the sensor module 930.

More specifically, in operation 1015, the electronic device 900 may determine whether the separation distance from the user is a threshold level L_th or less. The threshold level L_th may be a distance enough to obtain a change in the facial expression of the user. The threshold level L_th may be about 0.2 meters. When the separation distance from the user is the threshold level L_th or less, the electronic device 900 may obtain information about the change in the facial expression of the user from image data provided by the camera module 920 using vision recognition technology.

The electronic device 900 may interact with the user in operation 1017. The electronic device 900 may identify an action repeated by the user through an interaction with the user. When the electronic device 900 detects the repetitive action of the user, the electronic device 110 may analyze the intent of the user corresponding to the detected action of the user. For example, if it is identified that the same action of the user is repeated two or more times within a specified number of seconds, the electronic device 900 may predict that there is a function desired by the user but difficult to execute.

In operation 1019, the electronic device 900 may identify the movement of the electronic device 900 by the user using the detection signal provided from the IMU sensor. The IMU sensor is a six-axis sensor- and may be a sensor in which a gyro sensor and an acceleration sensor are combined. The IMU sensor may detect the movement and/or the inclination of the electronic device 900. The IMU sensor may provide a structure or function in which an acceleration sensor for detecting an inclination and a gyro sensor for detecting an angular velocity are combined.

The electronic device 900 may analyze the user's intent based on at least one of the user action information and/or the user facial expression information obtained by performing operations 1015 to 1019. For example, the electronic device 900 may analyze difficulty for the user to visually identify the content displayed on the screen when it is identified based on the collected information that the user repeats, at least two times, the action of moving the screen towards and away from the face. For example, when identifying the action of the user, based on the collected information, who repeatedly presses the button to increase the volume in a short period of time, the electronic device 900 may analyze that the user wants to hear the sound better or more clearly. For example, when identifying the action of the user, based on the collected information, who repeatedly presses the button to decrease the volume for a short period of time, the electronic device 900 may analyze that the user desires not to have the voice on the phone heard by another. For example, when identifying the action of the user repeatedly making a gesture for pitch zoom-in or pitch zoom-out for adjusting the screen size, the electronic device 900 may analyze that the user wants to zoom in or out the screen. For example, the electronic device 900 may analyze that it is difficult for the user to visually identify the content displayed on the screen when identifying the action of the user repeatedly frowning or squinting or taking on/off the glasses.

Table 1 below shows an example of analyzing the user's intent using the obtained information.

TABLE 1

| Context Information | Action Information | Vision Information | User Intent |
|---|---|---|---|
| ① text<br>② image<br>③ video<br>④ voice<br>⑤ sound<br>⑥ button input<br>⑦ screen with fixed layout (web, app) | moves the device towards<br>moves the device away from<br>repeats moving the device towards/away from<br>pinch zoom in/out<br>turns up the volume button<br>turns down the volume button<br>incorrect the button input area<br>keyboard input error (repetitive backspaces occur)<br>shines the device<br>rotates the device left and right (left and right, back and forth, up and down)<br>⑪ shakes the device | user facial expression (frowning)<br>users who wear glasses take off her glasses<br>④ put on sunglasses | text out of focus.<br>wants to see the text clearly.<br>wants to zoom in the screen.<br>situation in which volume-up is avoided.<br>wants to hear the sound clearly.<br>. . .<br>⑥ wants to see the image clearly.<br>⑦ wants to make an accurate button input.<br>⑧ The default values already set do not match the current situation. (screen brightness, screen rotation)<br>⑨ does not want to show my accessibility use screen to others.<br>⑩ wants to see the screen in a different focus/color than usual. |

Referring to Table 1, when the context information is '①text', the user's action information is '③ repeats moving the device towards/away from', and the vision information is '③ wants to zoom in the screen', the electronic device 900 may analyze that the user's intent is '③ wants to zoom in the screen.' When the electronic device 900 identifies the user's intent, based on the information collected with respect to the change in the user's action or facial expression, in operation 1021, the electronic device 900 may obtain one or more customized functions to be suggested to the user for the user's intent.

Table 2 below shows an example list of user action intents matched with accessibility functions that may be recommended corresponding to the user's intent.

TABLE 2

| user intent | accessibility function | |
|---|---|---|
| text out of focus | vision aid | font size and style |
| wants to see the text clearly | | high contrast text |
| wants to zoom in the screen | | zoom-in |
| wants to see the image clearly | | color adjustment |
| wants to see in a different focus/color than usual | | color filter |
| situation in which volume-up is avoided | hearing aid | subtitle settings |
| wants to hear the sound clearly | | sound quality optimization |
| wants to make an accurate button input | motion aid | touch settings |
| does not want to show my accessibility use screen to others | common aid | accessibility function pause |
| The default values already set do not match the current situation. | | temporarily release default settings |

According to Table 2, when the user intent is a vision-related item, the electronic device 900 may select one or more accessibility functions from accessibility functions related to vision aid as a customized function.

The electronic device 900 may output the one or more customized functions on a display screen. The display screen may be a screen obtained by processing the one or more customized functions in the form of a list. The display screen may include an icon capable of executing each of the one or more customized functions. The user may select an indication or icon corresponding to one or more customized functions displayed on the screen and request execution of the corresponding customized function.

In operation 1023, the electronic device 900 may determine whether at least one target customized function is selected by the user. When at least one target customized function is selected by the user, the electronic device 900 may execute the selected customized function in operation 1025. Execution of the selected customized function allows at least one customized function desired by the user to be performed. For example, when the customized function selected by the user is a 'zoom-in' function, the electronic device 900 may zoom in on the screen. For example, when the customized function selected by the user is the 'subtitle description' function, the electronic device 900 may display a subtitle at the lower end of the image being outputted through the screen.

In operation 1027, the electronic device 900 may monitor whether an end event for requesting to end the target customized function by the user occurs. When the electronic device 900 detects the occurrence of the end event, the electronic device 900 may end the execution of the target customized function in operation 1029.

Figure 11:
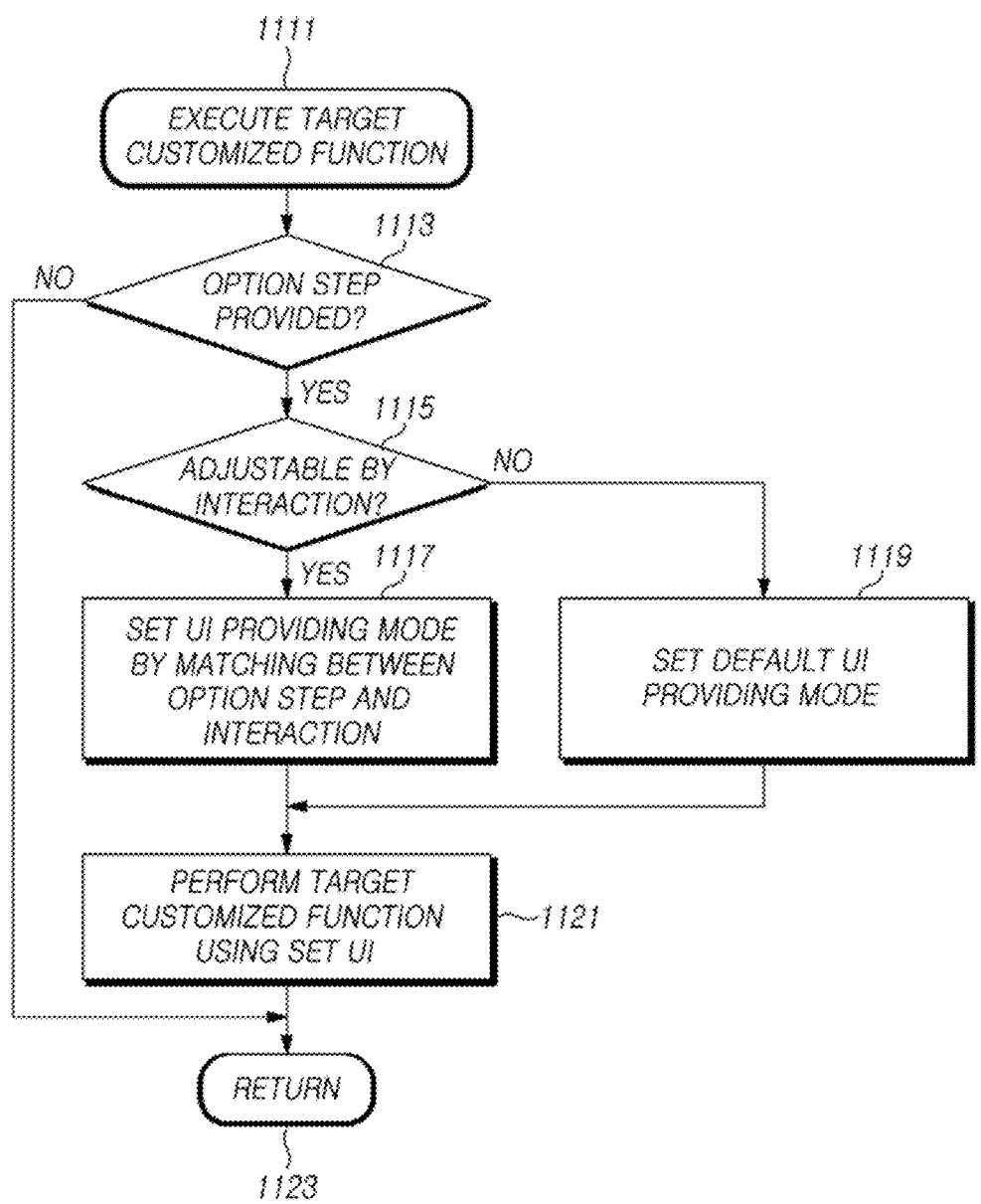
FIG. 11 is a control flowchart for executing a target customized function in an electronic device according to an embodiment.

FIG. 11 is a control flowchart for executing a target customized function in an electronic device, e.g., the electronic device 110 of FIG. 1 or the electronic device 900 of FIG. 9, according to an embodiment.

Referring to FIG. 11, in operation 1111, the electronic device 900 may execute at least one target customized function selected by the user. When the at least one target customized function is executed, the electronic device 900 may determine whether providing the option step is requested by the user in operation 1113. When the providing of the option step is requested by the user, the electronic device 900 may determine whether the target customized function is set to be adjustable by interaction in operation 1115.

When the target customized function is set not to be adjustable by interaction, in operation 1119, the electronic device 900 may set the user interface (UI) for the target customized function as the default UI providing mode. When the target matching function is set to be adjustable by interaction, in operation 1117, the electronic device 900 may set the UI for the target matching function as the UI providing mode by interaction matching with the option step.

In operation 1121, the electronic device 900 may perform a target customized function using the set UI, that is, the UI that is one of the UI providing mode capable of adjustment by interaction or the default UI providing mode.

Figure 12A:
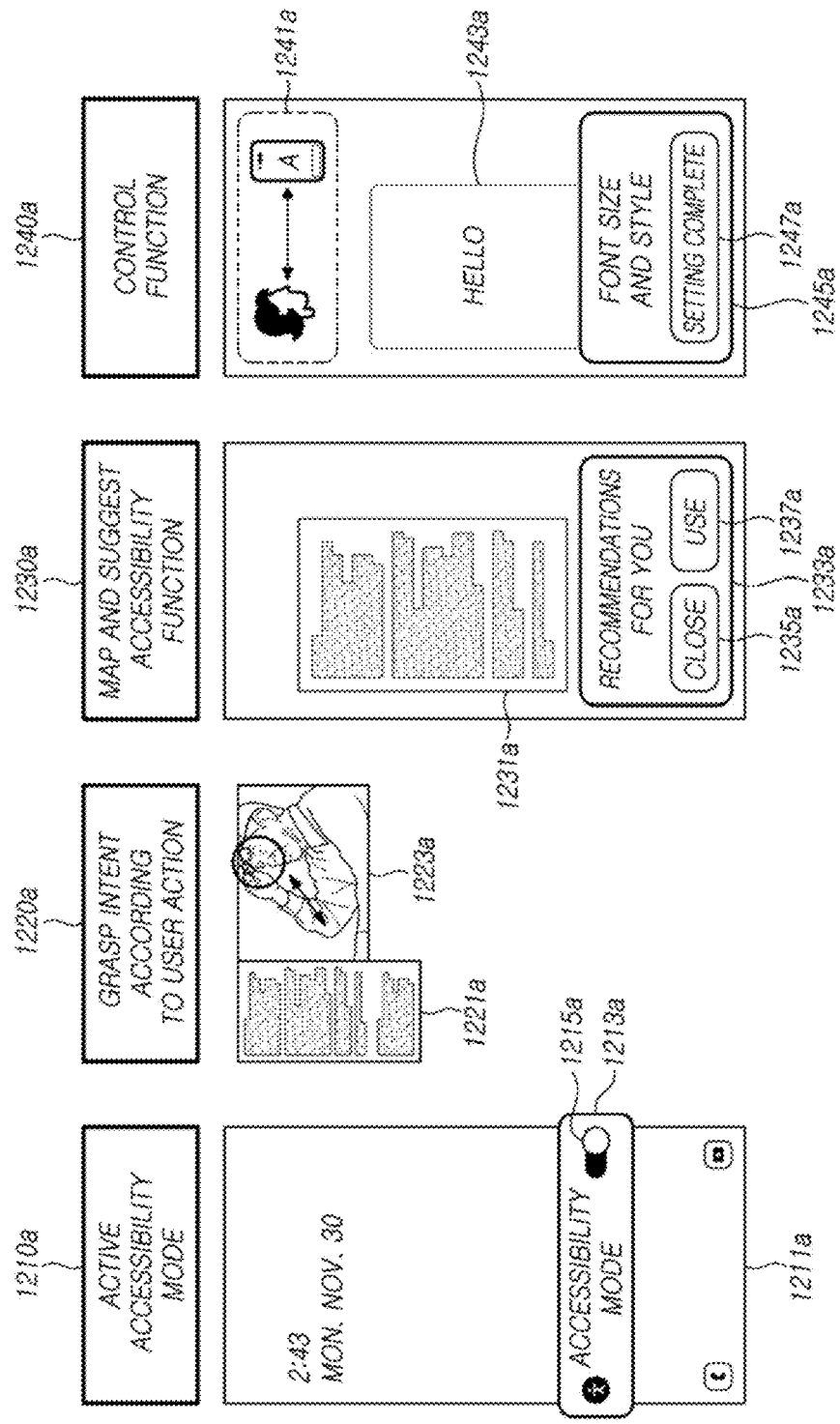

FIG. 12A illustrates a scenario in which an electronic device, e.g., the electronic device 110 of FIG. 1 or the electronic device 900 of FIG. 9, recommends and executes a customized function for a vision aid function, which is an accessibility function, according to an embodiment.

Referring to FIG. 12A, when an event for setting the accessibility mode occurs, the electronic device 900 may output a setup screen 1211a for activating the accessibility mode (1210a) through the display. The setup screen 1211a may include, e.g., a control button 1215a for selecting a state (activation or deactivation) in the window 1213a for setting the accessibility mode.

When the accessibility mode is activated by the user, the electronic device 900 may determine the intent according to the user action (1220a). As an example, the electronic device 900 may collect information such as context information, the user's action, or a change in facial expression through an interaction with the user. The electronic device 900 may analyze that the user's intent is 'to see the text clearly' when data about the action 1223a of the user taking away and then bringing close the screen of the electronic device 900 and/or lifting/adjusting glasses is collected while text content is displayed (1221a).

When the intent of the user is identified, the electronic device 900 may map the accessibility function and suggest it to the user (1230a). For example, the electronic device 900 may analyze that the user's intent is 'to see the text clearly' and recommend 'the font size/thickness adjustment function' while outputting a guide message 1233a, 'adjust the font size and style if you can't see the text clearly,' through the display. The electronic device 900 may display a 'use' function button 1237a selectable to activate the 'font size/thickness adjustment function' and a 'close' function button 1235a selectable to avoid activating the 'font size/thickness adjustment function', together with the guide message.

The electronic device 900 may control the customized function (1240a). As an example, when the 'font size/thickness adjustment function' is activated by the user's selection, the electronic device 900 may output a guide message 1245a, 'the optimized font size and style can be used from now on,' through the display. The electronic device 900 may display a function button 1247 for requesting 'setting complete' through the display.

Figure 12B:
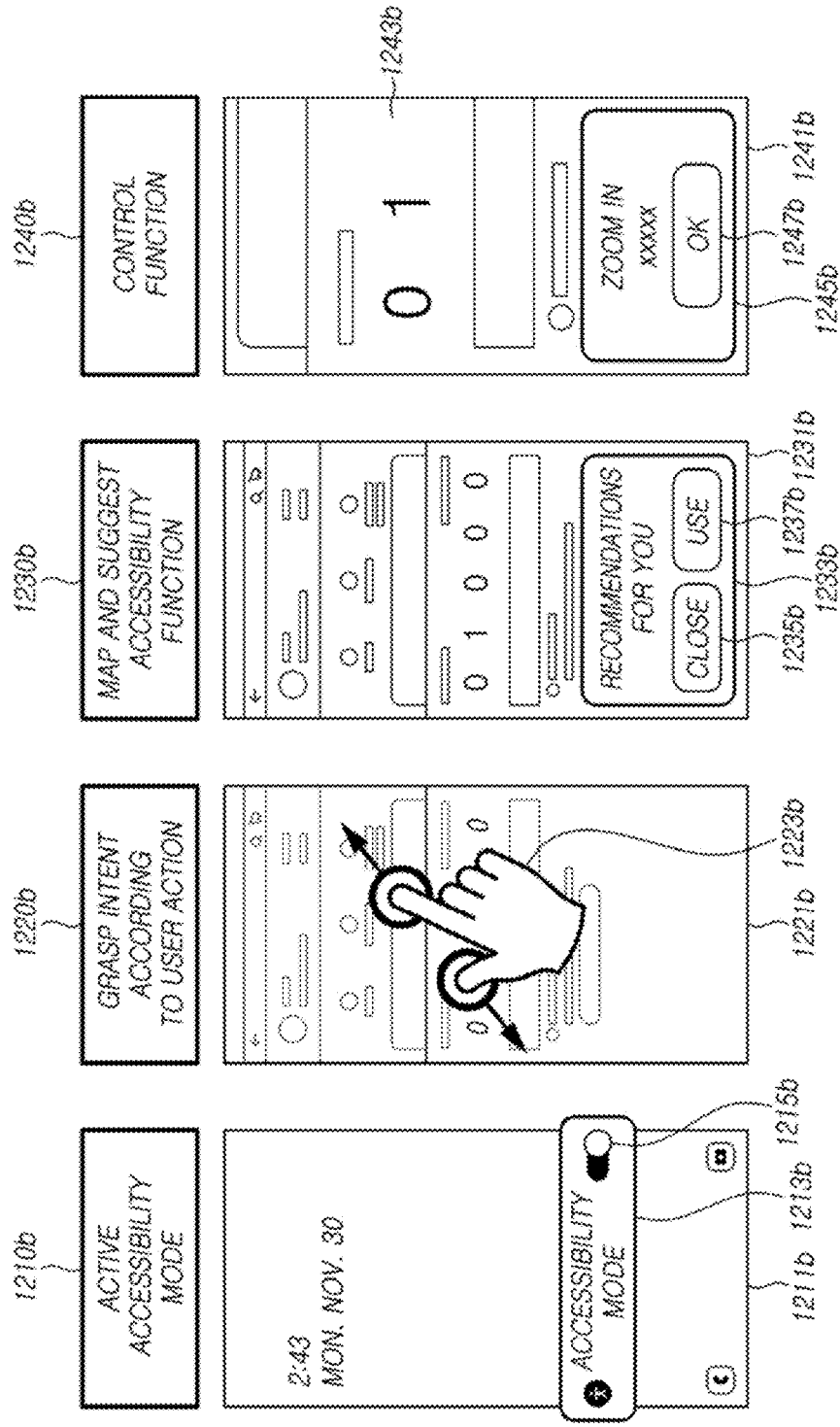

FIG. 12B illustrates a scenario in which an electronic device, e.g., the electronic device 110 of FIG. 1 or the electronic device 900 of FIG. 9, recommends and executes a customized function for a vision aid function, which is an accessibility function, according to an embodiment.

Referring to FIG. 12B, when an event for setting the accessibility mode occurs, the electronic device 900 may output a setup screen 1211*b* for activating the accessibility mode (1210*b*) through the display. The setup screen 1211*b* may include, e.g., a control button 1215*b* for selecting a state (activation or deactivation) in the window 1213*b* for setting the accessibility mode.

When the accessibility mode is activated by the user, the electronic device 900 may determine the intent according to the user action (1220*b*). For example, the electronic device 900 may collect information such as context information, the user's action, or a change in facial expression through an interaction with the user. When data about the action 1223*b* of the user zooming out or in the screen of the electronic device 900 is collected in the state 1221*b* in which the page in which the screen is not zoomed-in is displayed, the electronic device 900 may analyze that the user's intent is 'to adjust the size of the screen'.

When the intent of the user is identified, the electronic device 900 may map the accessibility function and suggest it to the user (1230*b*). As an example, when the electronic device 900 analyzes that the user's intent is 'to adjust the size of the screen', the electronic device 900 may output a guide message 1233*b*, 'If you want to zoom in the screen, use the zoom-in function like a magnifying glass,' through the display while recommending the 'zoom-in (magnifying glass) function.' The electronic device 900 may display a 'use' function button 1237*b* selectable to activate the 'zoom-in (magnifying glass) function' and a 'close' function button 1235*b* selectable to avoid activating the 'zoom-in (magnifying glass) function', together with the guide message.

The electronic device 900 may control the customized function (1240*b*). As an example, when the 'zoom-in (magnifying glass) function' is activated by the user's selection, the electronic device 900 may output a guide message 1245*b* indicating how to use the function through the display, such as 'If you press the screen twice, screen zooms in, and if you open your fingers, screen further zooms in.' The electronic device 900 may display a function button 1247*b* for requesting 'OK' through the display.

FIG. 12C illustrates a scenario in which an electronic device, e.g., the electronic device 110 of FIG. 1 or the electronic device 900 of FIG. 9, recommends and executes a customized function for a hearing aid function, which is an accessibility function, according to an embodiment.

Referring to FIG. 12C, when an event for setting the accessibility mode occurs, the electronic device 900 may output a setup screen 1211*c* for activating the accessibility mode (1210*c*) through the display. The setup screen 1211*c* may include, e.g., a control button 1215*c* for selecting a state (activation or deactivation) in the window 1213*c* for setting the accessibility mode.

When the accessibility mode is activated by the user, the electronic device 900 may determine the intent according to the user action (1220*c*). For example, the electronic device 900 may collect information such as context information, the user's action, or a change in facial expression through an interaction with the user. If data about the action 1223*c* of continuously manipulating the volume key is collected while the user is on the phone (1221*c*), the electronic device 900 may analyze that the user's intent is 'to hear the sound clearly'.

When the intent of the user is identified, the electronic device 900 may map the accessibility function and suggest it to the user (1230*c*). As an example, if the electronic device 900 analyzes that the user's intent is 'to hear the sound clearly,' the electronic device 900 may output a guide message 1233*c*, 'If you want to hear the sound clearly, try to optimize sound quality,' through the display. The electronic device 900 may display a 'use' function button 1237*c* selectable to activate the 'sound quality optimization function' and a 'close' function button 1235*c* selectable to avoid activating the 'sound quality optimization function', together with the guide message.

The electronic device 900 may control the customized function (1240*c*). As an example, when the 'sound quality optimization function' is activated by the user's selection, the electronic device 900 may output a guide message 1245*c*, 'Please adjust the sound quality by pressing the volume button,' through the display. The user command processing module may display a function button 1247*c* for requesting 'setting complete' through the display.

Figure 12D:
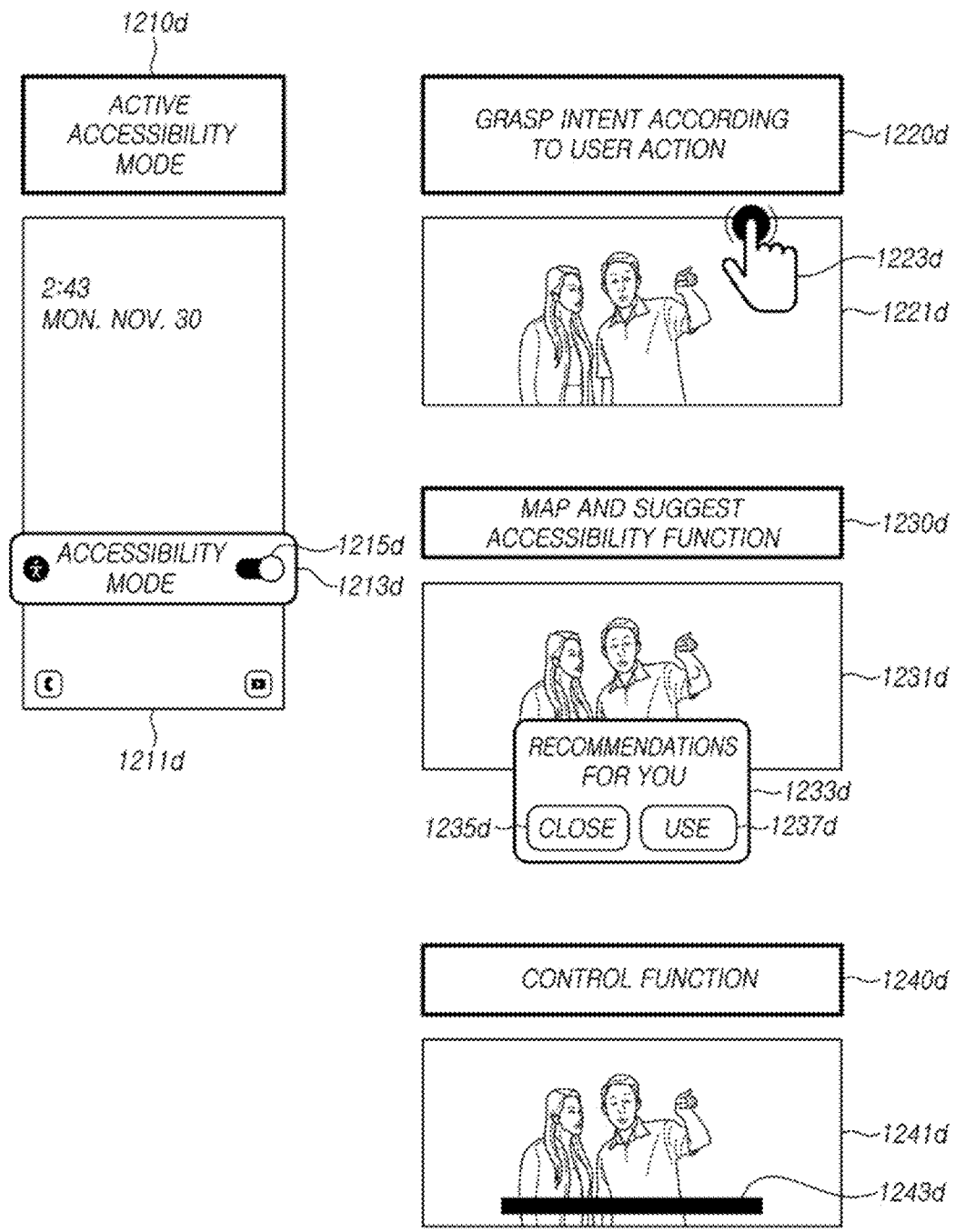

FIG. 12D illustrates a scenario in which an electronic device, e.g., the electronic device 110 of FIG. 1 or the electronic device 900 of FIG. 9, recommends and executes a customized function for a hearing aid function, which is an accessibility function, according to an embodiment.

Referring to FIG. 12D, when an event for setting the accessibility mode occurs, the electronic device 900 may output a setup screen 1211*d* for activating the accessibility mode (1210*d*) through the display. The setup screen 1211*d* may include a control button 1215*d* for selecting a state (activation or deactivation) in the window 1213*d* for setting the accessibility mode.

When the accessibility mode is activated by the user, the electronic device 900 may determine the intent according to the user action (1220*d*). For example, the electronic device 900 may collect information such as context information, the user's action, or a change in facial expression through an interaction with the user. If data about the action 1223*d* of bringing the screen close and reducing the sound volume on the screen, the electronic device 900 may analyze that the user's intent is 'to see the subtitle'.

When the intent of the user is identified, the electronic device 900 may map the accessibility function and suggest it to the user (1230*d*). For example, when the electronic device 900 analyzes that the user's intent is 'to see the subtitles', the electronic device 900 may output a guide message 1233*d*, 'Turn on the subtitle function if you can't hear the sound,' through the display. The electronic device 900 may display a 'use' function button 1237*d* selectable to activate the 'subtitle function' and a 'close' function button 1235*d* selectable to avoid activating the 'subtitle function,' together with the guide message.

The electronic device 900 may control the customized function (1240*d*). For example, the electronic device 900 may output the subtitle 1243*d*.

Figure 12E:
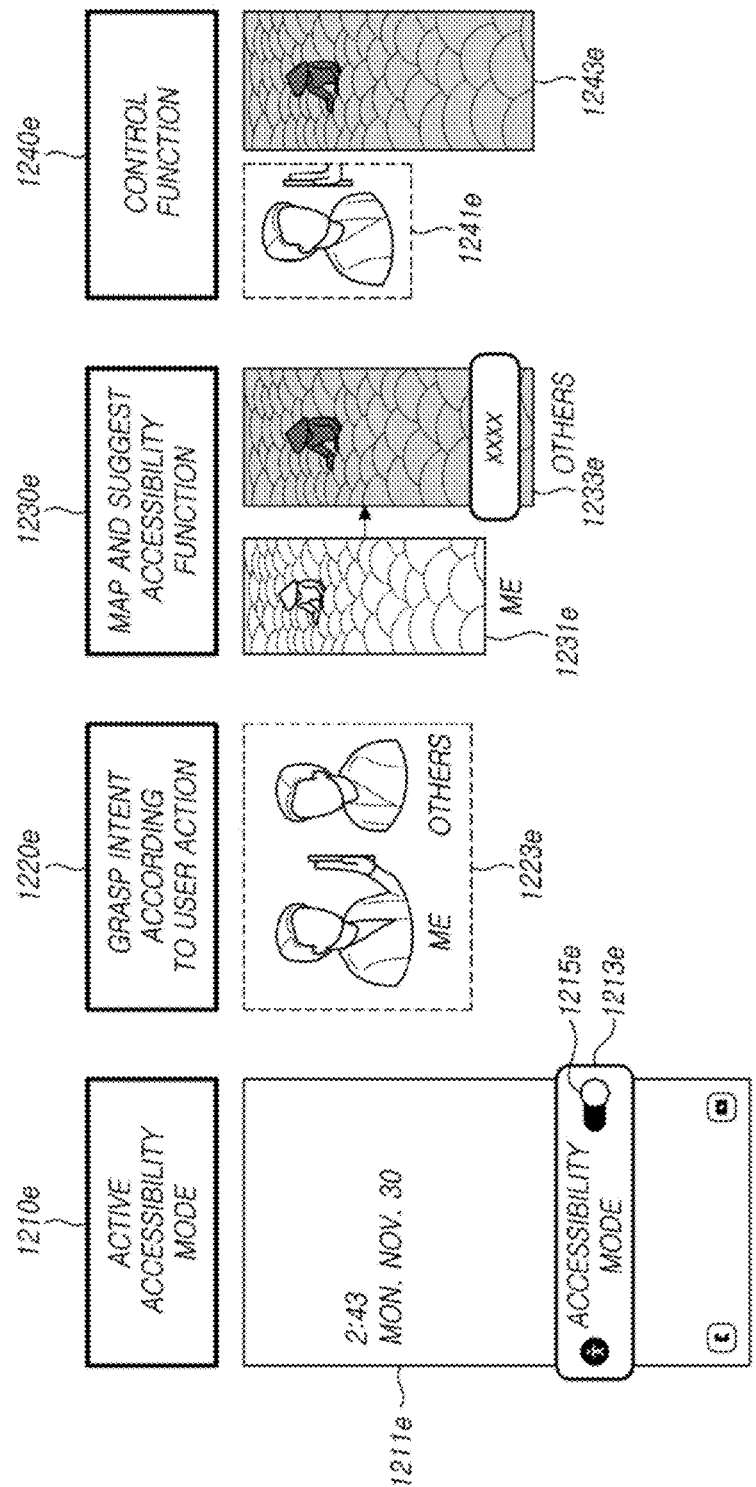

FIG. 12E illustrates a scenario in which an electronic device, e.g., the electronic device 110 of FIG. 1 or the electronic device 900 of FIG. 9, supports pause of an accessibility function, according to an embodiment.

Referring to FIG. 12E, when an event for setting the accessibility mode occurs, the electronic device 900 may output a setup screen 1211*e* for activating the accessibility mode (1210*e*) through the display. The setup screen 1211*e* may include, e.g., a control button 1215e for selecting a state (activation or deactivation) in the window 1213e for setting the accessibility mode.

When the accessibility mode is activated by the user, the electronic device 900 may determine the intent according to the user action (1220e). For example, the electronic device 900 may collect context information or information such as a movement of the electronic device 900 through an interaction with the user. If data about the action 1223e of the user rotating the screen of the electronic device 900 toward another person is collected, the electronic device 900 may analyze that the user's intent is 'to temporarily release the accessibility function'.

When the intent of the user is identified, the electronic device 900 may map the accessibility function and suggest it to the user (1230e). For example, when the electronic device 900 analyzes that the user's intent is 'to temporarily release the accessibility function', the electronic device 900 may pause the accessibility function. The electronic device 900 may output a guide message, 'accessibility mode pause,' through the display. The electronic device 900 may allow a color screen 1233e to be visible rather than a black-and-white screen 1231e.

The electronic device 900 may control the customized function (1240e). As an example, when the screen of the electronic device 900 is directed to the user, the electronic device 900 may re-activate the accessibility function that has paused (1241e). The electronic device 900 may switch the screen into the black-and-white screen 1243e.

FIG. 12F illustrates a scenario in which an electronic device, e.g., the electronic device 110 of FIG. 1 or the electronic device 900 of FIG. 9, supports termination of an accessibility function, according to an embodiment.

Referring to FIG. 12F, when an event for setting the accessibility mode occurs, the electronic device 900 may output a setup screen 1211f for activating the accessibility mode (1210f) through the display. The setup screen 1211f may include, a control button 1215f for selecting a state (activation or deactivation) in the window 1213f for setting the accessibility mode.

When the accessibility mode is activated by the user, the electronic device 900 may determine the intent according to the user action (1220f). For example, the electronic device 900 may collect information such as context information, the user's action, or a change in facial expression through an interaction with the user. When data about the action 1221f of the user shaking the electronic device 900 is collected, the electronic device 900 may analyze that the user's intent is 'to request deactivation of the accessibility function'.

When the intent of the user is identified, the electronic device 900 may map the accessibility function and suggest it to the user (1230f). For example, when the electronic device 900 analyzes that the user's intent is 'to request deactivation of the accessibility function,' the electronic device 900 may terminate the accessibility function. The electronic device 900 may output a guide message 1235f, 'The black and white screen is terminated,' through the display. The electronic device 900 may switch the screen into the color screen 1233f.

The electronic device according to various embodiments of the disclosure may be one of various types of electronic devices. The electronic devices may include, for example, a portable communication device, e.g., a smartphone, a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect, e.g., importance or order. It is to be understood that if an element, e.g., a first element, is referred to, with or without the term "operatively" or "communicatively", as "coupled with," "coupled to," "connected with," or "connected to" another element, e.g., a second element, it means that the element may be coupled with the other element directly, e.g., wiredly, wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software, e.g., the program, including one or more instructions that are stored in a storage medium, e.g., the memory 940, that is readable by a machine, e.g., the electronic device 110 or 900. For example, a processor, e.g., the processor 910, of the machine, e.g., the electronic device 110 or 900, may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal, e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium, e.g., compact disc read only memory (CD-ROM), or be distributed, e.g., downloaded or uploaded, online via an application store, e.g., Play Store", or between two user devices, e.g., smart phones, directly. If distributed online, at least part of the computer program product may be temporarily generated or at least temporarily stored in the machine-readable storage medium, such as memory of the manufacturer's server, a server of the application store, or a relay server.

According to various embodiments, each component, e.g., a module or a program, of the above-described components may include a single entity or multiple entities. Some of the plurality of entities may be separately disposed in different components. According to various embodiments, one or more of the above-described components may be omitted, or one or more other components may be added. Alternatively or additionally, a plurality of components, e.g., modules or programs, may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed:

1. An electronic device, comprising:
a display module including a touch panel and a display;
at least one sensor, to detect an interaction of a user with the electronic device and to generate a detection signal based on the interaction of the user with the electronic device detected by the at least one sensor; and
at least one processor electrically connectable to the display module or the at least one sensor, so that while the at least one processor is electrically connected, the at least one processor is configured to:
determine a user intent to perform an operation through the electronic device based on information collected in association with the interaction of the user with the electronic device, the collected information includes information of a user gesture that repeatedly occurs based on the interaction of the user detected by the at least one sensor;
determine one or more customized functions for performing the operation through the electronic device to be suggested to the user, among functions of the electronic device, in consideration of the determined user intent; and
control the display module to display information regarding the one or more customized functions on the display.

2. The electronic device of claim 1, wherein the at least one processor is configured to:
execute a target customized function selected by the user from among the one or more customized functions.

3. The electronic device of claim 2, wherein the at least one processor is configured to:
identify a user gesture in response to execution of the target customized function; and
control the target customized function according to an instruction corresponding to the identified user gesture in response to execution of the target customized function.

4. The electronic device of claim 1, wherein the at least one processor is configured to:
activate an interaction function in response to a request to activate an accessibility mode by the user.

5. The electronic device of claim 4, wherein the at least one processor is configured to:
obtain a changed facial expression of the user to determine the one or more customized functions to be suggested to the user; and
determine the one or more customized functions in consideration of the changed facial expression.

6. The electronic device of claim 1, further comprising:
a memory to store information of a user action intent mapping a relationship of plurality of accessibility functions that match the user intent obtained from the user gesture,
wherein the at least one processor is configured to determine one or more accessibility functions, among the plurality of accessibility functions, mapped to the user gesture in the information of the user action intent as the one or more customized functions.

7. The electronic device of claim 1, wherein the at least one processor is configured to output, through the display module, a screen to set activation of an accessibility mode to suggest a customized function, among the one or more customized functions, to the user in response to initial turn-on of the electronic device.

8. The electronic device of claim 1, wherein the at least one processor is configured to output, through the display module, a screen to set activation of an accessibility mode to suggest a customized function, among the one or more customized functions, to the user in response to a request to unlock the electronic device.

9. The electronic device of claim 8, wherein the at least one processor is configured to output, through the display module, a screen to set activation of the accessibility mode to suggest a customized function, among the one or more customized functions, to the user in response to selection of a function button on a screen displayed by the display module.

10. The electronic device of claim 1, wherein the at least one processor is configured to consider category information to classify a type of content being currently executed to determine the one or more customized functions.

11. A method of recommending a function to a user by an electronic device, the method comprising:
obtaining information of a user gesture that repeatedly occurs based on an interaction of the user with the electronic device;
determining a user intent to perform an operation through the electronic device based on the information of the user gesture;
determining one or more customized functions for performing the operation through the electronic device to be suggested to the user, among functions of the electronic device, in consideration of the determined user intent; and
displaying information regarding the one or more customized functions on a display.

12. The method of claim 11, further comprising:
executing a target customized function selected by the user from among the one or more customized functions.

13. The method of claim 12, further comprising:
identifying a user gesture in response to execution of the target customized function; and
controlling the target customized function according to an instruction corresponding to the identified user gesture in response to execution of the target customized function.

14. The method of claim 11, wherein an interaction function with the user is activated in response to a request to activate an accessibility mode by the user.

15. The method of claim 11, wherein the determining of the one or more customized functions includes:
   obtaining a changed facial expression of the user to determine the one or more customized functions to be suggested to the user; and
   determining the one or more customized functions in consideration of the changed facial expression.

16. The method of claim 11, wherein the determining of the one or more customized functions includes:
   determining one or more accessibility functions mapped to the user gesture in stored information of a user action intent mapping a relationship between plurality of accessibility functions that match the user intent obtained from the user gesture, and
   determining an accessibility function, among the one or more accessibility functions, as the one or more customized functions.

17. The method of claim 11, further comprising:
   displaying, through on the display, a screen to set activation of an accessibility mode to suggest a customized function, among the one or more customized functions, to the user in response to initial turn-on of the electronic device.

18. The method of claim 11, further comprising:
   displaying a screen to set activation of an accessibility mode on the display in response to a request to unlock the electronic device.

19. The method of claim 18, further comprising:
   displaying, on the display, a screen to set activation of the accessibility mode to suggest a customized function, among the one or more customized functions, to the user in response to selection, by the user, of a function button on a screen displayed on the display.

20. The method of claim 11, wherein the determining of the one or more customized functions includes determining the one or more customized functions in consideration of category information to classify a type of content being currently executed.

* * * * *